United States Patent
Yu et al.

(10) Patent No.: US 11,757,585 B2
(45) Date of Patent: Sep. 12, 2023

(54) DATA TRANSMISSION METHOD AND RELATED APPARATUS

(71) Applicant: Huawei Technologies Co., Ltd., Shenzhen (CN)

(72) Inventors: Jian Yu, Shenzhen (CN); Mengshi Hu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/941,778

(22) Filed: Sep. 9, 2022

(65) Prior Publication Data

US 2023/0006787 A1    Jan. 5, 2023

Related U.S. Application Data

(63) Continuation of application No. PCT/CN2021/080567, filed on Mar. 12, 2021.

(30) Foreign Application Priority Data

Mar. 12, 2020 (CN) .......................... 202010172792.6

(51) Int. Cl.
*H04L 5/00* (2006.01)
*H04W 72/04* (2023.01)
(Continued)

(52) U.S. Cl.
CPC ......... *H04L 5/0044* (2013.01); *H04W 72/044* (2013.01); *H04W 80/02* (2013.01)

(58) Field of Classification Search
CPC .... H04W 72/044; H04W 80/02; H04L 5/0044
See application file for complete search history.

(56) References Cited

U.S. PATENT DOCUMENTS

2004/0264428 A1* 12/2004 Choi ..................... H04W 48/08
370/338
2013/0034091 A1   2/2013 Kim et al.
(Continued)

FOREIGN PATENT DOCUMENTS

CN   109586889 A   4/2019
CN   110691114 A   1/2020
(Continued)

OTHER PUBLICATIONS

Lee et al. "SU PPDU SIG Contents Considerations," Mar. 5, 2020 https://mentor.ieee.org/802.11/dcn/20/11-20-0285-01-00be-su-ppdu-sig-contents-considerations.pptx (Year: 2020).*
(Continued)

*Primary Examiner* — Pankaj Kumar
*Assistant Examiner* — Kenneth P Hunt
(74) *Attorney, Agent, or Firm* — Slater Matsil, LLP

(57) ABSTRACT

This application provides a data transmission method and a related apparatus. The method includes: A network device generates a first physical layer protocol data unit PPDU. The first PPDU includes a first universal-Signaling field U-SIG field and a first extremely high throughput-Signaling field EHT-SIG field, a sum of a quantity of information bits of the first U-SIG field and a quantity of information bits of the first EHT-SIG field is less than or equal to 78 information bits, and at least one of the first U-SIG field and the first EHT-SIG field includes an identifier indication field, where the identifier indication field is used to uniquely identify one station. The network device sends an encoded first PPDU to a station.

14 Claims, 9 Drawing Sheets

(51) Int. Cl.
*H04W 72/044* (2023.01)
*H04W 80/02* (2009.01)

(56) References Cited

U.S. PATENT DOCUMENTS

| | | | |
|---|---|---|---|
| 2014/0362845 A1* | 12/2014 | Lee | H04B 7/0413 370/338 |
| 2015/0373587 A1 | 12/2015 | Josiam et al. | |
| 2018/0092127 A1 | 3/2018 | Park | |
| 2018/0205584 A1 | 7/2018 | Lim et al. | |
| 2019/0097850 A1 | 3/2019 | Kenney et al. | |
| 2020/0007283 A1 | 1/2020 | Chen et al. | |
| 2021/0045151 A1* | 2/2021 | Chen | H04W 72/0446 |
| 2021/0126755 A1 | 4/2021 | Gan et al. | |
| 2021/0135826 A1 | 5/2021 | Yu et al. | |
| 2021/0143966 A1 | 5/2021 | Yu et al. | |
| 2021/0195591 A1 | 6/2021 | Li | |
| 2022/0140942 A1* | 5/2022 | Vermani | H04L 27/2603 370/329 |

FOREIGN PATENT DOCUMENTS

| | | |
|---|---|---|
| CN | 110708148 A | 1/2020 |
| CN | 110768757 A | 2/2020 |
| CN | 110876200 A | 3/2020 |
| WO | 2020033815 A1 | 2/2020 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Standards Association, IEEE Std 802.11TM-2016 (Revision of IEEE Std 802.11-2012), Approved Dec. 7, 2016, 3534 pages.

Cao, R. et al., "Discussions on U-SIG Content and EHT-SIG Format," Date: Jan. 13, 2020, doc: IEEE 802.11-20/00087r0, Jan. 2020, 10 pages.

Huang, L. et al., "Discussion on EHT PPDU Formats," Date: Jan. 16, 020, doc: IEEE 802.11-20/0031r2, Jan. 2020, 11 pages.

"IEEE P802.11axTM/D6.0 Draft standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE P802.11axTM/D6.0, Nov. 2019, 780 pages.

"IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," IEEE Std 802.11acTM—2013, IEEE Standards Association, Approved Dec. 11, 2013, 425 pages.

Lee, W. et al., "SU PPDU SIG Contents Considerations," Date: Feb. 6, 2020, doc: IEEE 802.11-20/0285r0, Mar. 2020, 21 pages.

Vermani, S. et al., "PPDU Types and U-SIG Content," Date: Jan. 13, 2020, doc: IEEE 802.11-20/0049rl, Jan. 2020, 21 pages.

* cited by examiner

DATA TRANSMISSION METHOD AND RELATED APPARATUS

CROSS-REFERENCE TO RELATED APPLICATIONS

This application is a continuation of International Application No. PCT/CN2021/080567, filed on Mar. 12, 2021, which claims priority to Chinese Patent Application No. 202010172792.6, filed on Mar. 12, 2020. The disclosures of the aforementioned applications are hereby incorporated by reference in their entireties.

TECHNICAL FIELD

This application relates to the field of wireless local area network technologies, and in particular, to a data transmission method and a related apparatus.

BACKGROUND

In a related technology, in a scenario in which a network device performs single user (SU) transmission, a physical layer protocol data unit (Physical Protocol Data Unit, PPDU) sent by the network device to a station (STA) includes a legacy preamble, a high efficiency-Signaling field-A (High Efficient SIG A, HE-SIG-A), and data. In a scenario in which a network device performs multi-user (Multiple User, MU) transmission, a physical layer protocol data unit (Physical Protocol Data Unit, PPDU) sent by the network device to a station (STA) includes a legacy preamble, an HE-SIG-A, an HE-SIG-B, and data. The HE-SIG-A and the HE-SIG-B indicate signaling information required for demodulating a subsequent data field. It can be learned that the PPDU sent by the network device includes the HE-SIG-B only in the MU transmission scenario. As a result, the STA needs to use two greatly different reception policies to receive the PPDU in the SU transmission scenario and the PPDU in the MU transmission scenario. In addition, a quantity of bits of the HE-SIG-A is limited. As a result, in the SU scenario, information carried in the HE-SIG-A is limited.

SUMMARY

Embodiments of this application provide a data transmission method and a related apparatus, so that a signaling field in a PPDU can carry more information.

According to a first aspect, an implementation of this application provides a data transmission method. The method includes:

A network device generates a first physical layer protocol data unit PPDU, where the first PPDU includes a first universal-Signaling field U-SIG field and a first extremely high throughput-Signaling field EHT-SIG field, and a sum of a quantity of information bits of the first U-SIG field and a quantity of information bits of the first EHT-SIG field is less than or equal to 78 information bits.

The network device sends an encoded first PPDU to a station.

The first U-SIG field and the first EHT-SIG field meet at least one of the following:

At least one of the first U-SIG field and the first EHT-SIG field includes an identifier indication field, where the identifier indication field is used to uniquely identify one station, for example, the identifier indication field is used to uniquely identify one station in a basic service set (BSS) including the network device;

the first U-SIG field or the first EHT-SIG field includes a PPDU format indication field, and the PPDU format indication field occupies more than 1 information bit; or the first demodulation indication field includes a spatial reuse indication field.

In this way, the technical solution of this implementation of this application can ensure that the sum of the quantity of information bits of the first U-SIG field and the quantity of information bits of the first EHT-SIG field is less than or equal to 78 information bits. This reduces indication overheads. In addition, the first U-SIG field and the first EHT-SIG field can carry more information without increasing indication overheads.

It should be noted that names of the first EHT-SIG field and the second EHT-SIG field in this implementation of this application are determined according to the 802.11be standard. The names of the first EHT-SIG field and the second EHT-SIG field in this implementation of this application may alternatively be names of related SIG fields in other standard versions. The first EHT-SIG field and the second EHT-SIG field in this implementation of this application are not limited to SIG fields related to the 802.11be standard. The first EHT-SIG field and the second EHT-SIG field in this implementation of this application may be used to indicate SIG fields related to any standard version.

Specifically, in a possible implementation, at least one of the first U-SIG field and the first EHT-SIG field includes an identifier indication field. The identifier indication field is an association identifier (AID) for uniquely identifying one station in the basic service set including the network device. In this way, an identifier indication field included in the encoded first PPDU can uniquely indicate one STA. The STA may learn, from the first U-SIG field and the first EHT-SIG field, whether the encoded first PPDU is sent to the STA, without continuing to receive a subsequent preamble data field. This reduces power consumption of the station. In addition, even if a data field following the first U-SIG field and a data field following the first EHT-SIG field are not correctly received, because the station can determine, based on the first U-SIG field and the first EHT-SIG field, that the first PPDU is sent to the station, the station may perform hybrid automatic repeat requests (HARQ) combined reception based on subsequent retransmission. Moreover, a third-party device can learn of a sender and a receiver of the first PPDU without causing interference to a device that is performing transmission. This helps the third-party device perform scheduling.

In another possible implementation, a field that indicates a PPDU format and that is included in the first U-SIG field or the first EHT-SIG field occupies more than 1 information bit. In this case, compared with a solution in which only one information bit is occupied for indicating the PPDU format, in this implementation of this application, the PPDU format indication field occupies more than 1 information bit. In this way, the PPDU format indication field can carry more information, so that more functions can be supported.

The PPDU format indication field may indicate the PPDU format and indicate that a transmission mode is SU or MU transmission. In this way, when receiving a U-SIG field of first (N−1) information bits, the station can determine whether SU transmission or MU transmission is performed, and use a corresponding reception policy.

For example, the PPDU format indication field may further include information indicating that a transmission scenario is SU, MU non-orthogonal frequency division multiple access (MU non-orthogonal frequency division multiple, MU non-OFDMA), or MU OFDMA; may further include information indicating a trigger based (TB) frame; and may further include information indicating whether to perform puncturing.

In still another possible implementation, the first U-SIG field or the first EHT-SIG field includes a spatial reuse indication field. This can support a spatial reuse function.

Optionally, a length of the spatial reuse indication field is 2 information bits. The spatial reuse indication field may indicate any one of the following four items: an item for prohibiting parameterized spatial reuse (Parameterized Spatial reuse DISALLOW, PSR_DISALLOW), an item for prohibiting spatial reuse transmission (SR_RESTRICTED), an item for delaying spatial reuse transmission (SR_DELAY), and an item for prohibiting both PSR based spatial reuse and non-SR group (Group) overlapping basic service set (OBSS)-packet detection based spatial reuse. The spatial reuse indication field is used by the station to implement a corresponding spatial reuse function.

In some implementations, a length of a second U-SIG field of an unencoded second PPDU is equal to the quantity of information bits of the first U-SIG field, and both the quantity of information bits of the first U-SIG field and the quantity of information bits of the second U-SIG field are less than or equal to 52 information bits. The first PPDU is sent by the network device to one station when the network device performs single-user transmission, and the second PPDU is sent by the network device to a plurality of stations when the network device performs multi-user transmission. In this case, the quantity of information bits of the first U-SIG field in the first PPDU sent by the network device to the station in the SU scenario is equal to the quantity of information bits of the second U-SIG field in the second PPDU sent by the network device in the MU scenario. This can help reduce a difference between a reception policy for receiving the first U-SIG field by the station in the SU scenario and a reception policy for receiving the second U-SIG field by the station in the MU scenario, and help the station receive a U-SIG field in different scenarios.

In some implementations, the first U-SIG field and the first EHT-SIG field include an identifier indication field. The identifier indication field includes a first indication subfield and a second indication subfield. The first U-SIG field includes the first indication subfield, and the first EHT-SIG field includes the second indication subfield. In this way, idle information bits in the first U-SIG field and the first EHT-SIG field are fully used, thereby avoiding a case in which the quantity of information bits in the first U-SIG field or the first EHT-SIG field is increased because a unique station identifier needs to be indicated.

In some implementations, a start information bit of the first indication subfield is an $N^{th}$ information bit of the first U-SIG field, and a field type of first (N−1) information bits of the first U-SIG field is correspondingly the same as a field type of first (N−1) information bits of the second U-SIG field, where N is a positive integer greater than 1 and less than 35. In this way, when the station receives the first U-SIG field in the SU scenario and receives the second U-SIG field in the MU scenario, a same policy is used for receiving first parts of information bits. This helps reduce a difference between reception policies for receiving a U-SIG field by the station in different scenarios, and helps the station receive and demodulate a PPDU.

In some implementations, the field type of the first (N−1) information bits of the first U-SIG field and the field type of the first (N−1) information bits of the second U-SIG field include one or more of the following: a physical layer version indication field, an uplink/downlink indication field, a basic service set color indication field, a transmission opportunity indication field, a bandwidth indication field, a PPDU format indication field, a space-time block coding indication field, a spatial reuse indication field, a field indicating a guard interval and extremely high throughput-long training field size, a field indicating a low-density parity-check extra symbol segment, a field indicating a pre-forward error correction padding factor, a packet extension disambiguity indication field, and a preamble puncturing indication field.

In some implementations, a second EHT-SIG field of the unencoded second PPDU includes a station identifier indication field, where a field type of a field that follows the second indication subfield and that is of the first EHT-SIG field is the same as a field type of a field that follows the station identifier indication field and that is of the second EHT-SIG field. In this way, when the station receives the first U-SIG field in the SU scenario and receives the second U-SIG field in the MU scenario, a same policy is used for receiving information bits that follow the station identifier indication fields. This helps reduce a difference between reception policies for receiving a U-SIG field by the station in different scenarios, and helps the station receive and demodulate a PPDU.

In some implementations, the field type of the field that follows the second indication subfield and that is of the first EHT-SIG field and the field type of the field that follows the station identifier indication field and that is of the second EHT-SIG field include one or more of the following: a field indicating a number of space-time streams, a midamble periodicity, and Doppler, a beamforming indication field, a beam change indication field, a field indicating a modulation and coding scheme and whether dual carrier modulation is used, and a coding indication field.

In some implementations, the start information bit of the first indication subfield is the $N^{th}$ information bit of the first U-SIG field, and a field type of a field that follows an $N^{th}$ information bit and that is of the second U-SIG field and a field type of a field that is before the station identifier indication field and that is of the second EHT-SIG field include one or more of the following: a field indicating a number of EHT-SIG field symbols or a number of multi-user multiple-input multiple-output users, a field indicating an EHT-SIG field modulation and coding scheme and whether dual carrier modulation is used, a field indicating a number of extremely high throughput-long training field EHT-LTF symbols, a midamble periodicity, and Doppler, a resource unit allocation indication field, a preamble puncturing indication field, and a center 26-tone resource unit (Center 26-tone Resource Allocation, Center 26-tone RU) indication field.

In some implementations, the field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this way, information bits are saved in the foregoing manner, so that the first EHT-SIG field and the second EHT-SIG field can carry more information.

According to a second aspect, an implementation of this application provides a data transmission method. The method includes: A network device generates a PPDU, and the network device sends the PPDU to a station. The PPDU includes an EHT-SIG field, and the EHT-SIG field includes a field indicating a number of EHT-LTF symbols, a midamble periodicity, and Doppler. The field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols. In this case, a string group including a string is used to indicate Doppler and a midamble periodicity, and a value of the string indicates a number of EHT-LTF symbols. This can save information bits for indicating Doppler and the midamble periodicity.

According to a third aspect, an implementation of this application provides a data transmission method. The method includes: A network device generates a PPDU, and the network device sends the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. An $i^{th}$ information bit to a $j^{th}$ information bit of the first content channel carry a user field, and a field of first (i−1) information bits of the first content channel is the same as a field of first (i−1) information bits of the second content channel; or an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel. Both i and j are positive integers, and i<j. The field of the first (i−1) information bits of the first content channel and the field of the first (i−1) information bits of the second content channel may be understood as U-SIG overflow fields. In this case, the U-SIG overflow fields are duplicated and transmitted on the first content channel and the second content channel, so that a correct reception probability of the station can be increased.

According to a fourth aspect, an implementation of this application provides a data transmission method. The method includes: A network device generates a PPDU, and the network device sends the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. An $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j. In this way, a length of the first content channel is the same as a length of the second content channel. This helps the station receive the first content channel and the second content channel. In addition, the station may not read this padding field, so that a reading process of the station can be simplified.

According to a fifth aspect, an implementation of this application provides a data transmission method. The method includes: A network device generates a PPDU, and the network device sends the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. The first content channel includes a first sub user field, the second content channel includes a second sub user field, and a user field of a first user includes the first sub user field and the second sub user field. That is, in this implementation, a part of the user field of the same user is transmitted on the first content channel, and the other part is transmitted on the second content channel. In this way, a quantity of information bits for transmitting the user field can be increased, so that more information can be transmitted.

According to a sixth aspect, an implementation of this application provides a data transmission method. The method includes: A network device generates a PPDU, and the network device sends the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. A user field of the first content channel is the same as a user field of the second content channel. In this case, the user fields are duplicated and transmitted on the first content channel and the second content channel, so that a correct reception probability of the station can be increased, and reliability can be improved.

According to a seventh aspect, an implementation of this application provides a data transmission method. The method includes:

A station receives a first PPDU sent by a network device, and the station decodes the first PPDU to obtain a decoded first PPDU. The decoded first PPDU includes a first U-SIG field and a first EHT-SIG field, and a sum of a quantity of information bits of the first U-SIG field and a quantity of information bits of the first EHT-SIG field is less than or equal to 78 information bits.

The first U-SIG field and the first EHT-SIG field meet at least one of the following:

At least one of the first U-SIG field and the first EHT-SIG field includes an identifier indication field, where the identifier indication field is used to uniquely identify one station, for example, the identifier indication field is used to uniquely identify one station in a basic service set (Basic Service Set, BSS) including the network device;

the first U-SIG field or the first EHT-SIG field includes a PPDU format indication field, and the PPDU format indication field occupies more than 1 information bit; or the first demodulation indication field includes a spatial reuse indication field.

In this way, the technical solution of this implementation of this application can ensure that the sum of the quantity of information bits of the first U-SIG field and the quantity of information bits of the first EHT-SIG field is less than or equal to 78 information bits. This reduces indication overheads. In addition, the first U-SIG field and the first EHT-SIG field can carry more information without increasing indication overheads, so that the station can obtain more information from the first U-SIG field and the first EHT-SIG field.

Specifically, in a possible implementation, at least one of the first U-SIG field and the first EHT-SIG field includes an identifier indication field. The identifier indication field is an association identifier (AID) for uniquely identifying one station in the basic service set including the network device. In this way, an identifier indication field included in the encoded first PPDU can uniquely indicate one STA. The STA may learn, from the first U-SIG field and the first EHT-SIG field, whether the encoded first PPDU is sent to the STA, without continuing to receive a subsequent preamble data field. This reduces power consumption of the station. In addition, even if a data field following the first U-SIG field and a data field following the first EHT-SIG field are not correctly received, because the station can determine, based on the first U-SIG field and the first EHT-SIG field, that the first PPDU is sent to the station, the station may perform hybrid automatic repeat requests (HARQ) combined reception based on subsequent retransmission. Moreover, a third-party device can learn of a sender and a receiver of the first PPDU without causing interference to a device that is performing transmission. This helps the third-party device perform scheduling.

In another possible implementation, a field that indicates a PPDU format and that is included in the first U-SIG field or the first EHT-SIG field occupies more than 1 information bit. In this case, compared with a solution in which only one information bit is occupied for indicating the PPDU format, in this implementation of this application, the PPDU format indication field occupies more than 1 information bit. In this way, the PPDU format indication field can carry more information, so that more functions can be supported.

The PPDU format indication field may indicate the PPDU format and indicate that a transmission mode is SU or MU transmission. In this way, when receiving a U-SIG field of first (N−1) information bits, the station can determine whether SU transmission or MU transmission is performed, and use a corresponding reception policy.

For example, the PPDU format indication field may further include information indicating that a transmission scenario is SU, MU non-orthogonal frequency division multiple access (MU non-orthogonal frequency division multiple, MU non-OFDMA), or MU OFDMA; may further include information indicating a trigger based (TB) frame; and may further include information indicating whether to perform puncturing.

In still another possible implementation, the first U-SIG field or the first EHT-SIG field includes a spatial reuse indication field. This can support a spatial reuse function.

Optionally, a length of the spatial reuse indication field is 2 information bits. The spatial reuse indication field may indicate any one of the following four items: an item for prohibiting parameterized spatial reuse (Parameterized Spatial reuse DISALLOW, PSR_DISALLOW), an item for prohibiting spatial reuse transmission (SR_RESTRICTED), an item for delaying spatial reuse transmission (SR_DELAY), and an item for prohibiting both PSR based spatial reuse and non-SR group (Group) overlapping basic service set (OBSS)-packet detection based spatial reuse. The spatial reuse indication field is used by the station to implement a corresponding spatial reuse function.

In some implementations, a length of the second U-SIG field in a decoded second PPDU is equal to a quantity of information bits of the first U-SIG field, and both the quantity of information bits of the first U-SIG field and the quantity of information bits of the second U-SIG field are less than or equal to 52 information bits. The first PPDU is sent by the network device to one station when the network device performs single-user transmission, and the second PPDU is sent by the network device to a plurality of stations when the network device performs multi-user transmission. In this case, the quantity of information bits of the first U-SIG field in the first PPDU sent by the network device to the station in the SU scenario is equal to the quantity of information bits of the second U-SIG field in the second PPDU sent by the network device in the MU scenario. This can help reduce a difference between a reception policy for receiving the first U-SIG field by the station in the SU scenario and a reception policy for receiving the second U-SIG field by the station in the MU scenario, and help the station receive a U-SIG field in different scenarios.

In some implementations, the first U-SIG field and the first EHT-SIG field include an identifier indication field. The identifier indication field includes a first indication subfield and a second indication subfield. The first U-SIG field includes the first indication subfield, and the first EHT-SIG field includes the second indication subfield. In this way, idle information bits in the first U-SIG field and the first EHT-SIG field are fully used, thereby avoiding a case in which the quantity of information bits in the first U-SIG field or the first EHT-SIG field is increased because a unique station identifier needs to be indicated.

In some implementations, a start information bit of the first indication subfield is an $N^{th}$ information bit of the first U-SIG field, and a field type of first (N−1) information bits of the first U-SIG field is correspondingly the same as a field type of first (N−1) information bits of the second U-SIG field, where N is a positive integer greater than 1 and less than 35. In this way, when the station receives the first U-SIG field in the SU scenario and receives the second U-SIG field in the MU scenario, a same policy is used for receiving first parts of information bits. This helps reduce a difference between reception policies for receiving a U-SIG field by the station in different scenarios, and helps the station receive and demodulate a PPDU.

In some implementations, the field type of the first (N−1) information bits of the first U-SIG field and the field type of the first (N−1) information bits of the second U-SIG field include one or more of the following: a physical layer version indication field, an uplink/downlink indication field, a basic service set color indication field, a transmission opportunity indication field, a bandwidth indication field, a PPDU format indication field, a space-time block coding indication field, a spatial reuse indication field, a field indicating a guard interval and extremely high throughput-long training field size, a field indicating a low-density parity-check extra symbol segment, a field indicating a pre-forward error correction padding factor, a packet extension disambiguity indication field, and a preamble puncturing indication field.

In some implementations, a second EHT-SIG field of the unencoded second PPDU includes a station identifier indication field, where a field type of a field that follows the second indication subfield and that is of the first EHT-SIG field is the same as a field type of a field that follows the station identifier indication field and that is of the second EHT-SIG field. In this way, when the station receives the first U-SIG field in the SU scenario and receives the second U-SIG field in the MU scenario, a same policy is used for receiving information bits that follow the station identifier indication fields. This helps reduce a difference between reception policies for receiving a U-SIG field by the station in different scenarios, and helps the station receive and demodulate a PPDU.

In some implementations, the field type of the field that follows the second indication subfield and that is of the first EHT-SIG field and the field type of the field that follows the station identifier indication field and that is of the second EHT-SIG field include one or more of the following: a field indicating a number of space-time streams, a midamble periodicity, and Doppler, a beamforming indication field, a beam change indication field, a field indicating a modulation and coding scheme and whether dual carrier modulation is used, and a coding indication field.

In some implementations, the start information bit of the first indication subfield is the $N^{th}$ information bit of the first U-SIG field, and a field type of a field that follows an $N^{th}$ information bit and that is of the second U-SIG field and a field type of a field that is before the station identifier indication field and that is of the second EHT-SIG field include one or more of the following: a field indicating a number of EHT-SIG field symbols or a number of multi-user multiple-input multiple-output users, a field indicating an EHT-SIG field modulation and coding scheme and whether dual carrier modulation is used, a field indicating a number of extremely high throughput-long training field EHT-LTF symbols, a midamble periodicity, and Doppler, a resource unit allocation indication field, a preamble puncturing indication field, and a center 26-tone resource unit (Center 26-tone Resource Allocation, Center 26-tone RU) indication field.

In some implementations, the field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this way, information bits are saved in the foregoing manner, so that the first EHT-SIG field and the second EHT-SIG field can carry more information, and the station obtains more information.

According to an eighth aspect, an implementation of this application further provides a data transmission method. The method includes the following.

A station receives a PPDU sent by a network device. The PPDU includes an EHT-SIG field, and the EHT-SIG field includes a field indicating a number of EHT-LTF symbols, a midamble periodicity, and Doppler. The field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this way, the station determines Doppler and a midamble periodicity based on a string group including a string, and indicates a number of EHT-LTF symbols based on a value of the string. In this case, a quantity of information bits of a field indicating a number of EHT-LTF symbols, Doppler, and a midamble periodicity is reduced. In this way, the PPDU can carry more other information, so that the station can obtain more information from the PPDU.

According to a ninth aspect, an implementation of this application further provides a data transmission method. The method includes: A station receives a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. An $i^{th}$ information bit to a $j^{th}$ information bit of the first content channel carry a user field, and a field of first (i−1) information bits of the first content channel is the same as a field of first (i−1) information bits of the second content channel; or an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel. Both i and j are positive integers, and i<j. The field of the first (i−1) information bits of the first content channel and the field of the first (i−1) information bits of the second content channel may be understood as U-SIG overflow fields. In this case, the U-SIG overflow fields are duplicated and transmitted on the first content channel and the second content channel, so that a correct reception probability of the station can be increased.

According to a tenth aspect, an implementation of this application further provides a data transmission method. The method includes: A station receives a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. An $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j. In this way, a length of the first content channel is the same as a length of the second content channel. This helps the station receive the first content channel and the second content channel. In addition, the station may not read this padding field, so that a reading process of the station can be simplified.

According to an eleventh aspect, an implementation of this application further provides a data transmission method. The method includes: A station receives a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. The first content channel includes a first sub user field, the second content channel includes a second sub user field, and a user field of a first user includes the first sub user field and the second sub user field. That is, in this implementation, a part of the user field of the same user is transmitted on the first content channel, and the other part is transmitted on the second content channel. In this way, a quantity of information bits for transmitting the user field can be increased, so that more information can be transmitted.

According to a twelfth aspect, an implementation of this application further provides a data transmission method. The method includes: A station receives a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. A user field of the first content channel is the same as a user field of the second content channel. In this case, the user fields are duplicated and transmitted on the first content channel and the second content channel, so that a correct reception probability of the station can be increased, and reliability can be improved.

According to a thirteenth aspect, an implementation of this application further provides a network device. The network device includes:

a processing unit, configured to generate a first PPDU, where the first PPDU includes a first universal-Signaling field U-SIG field and a first extremely high throughput-Signaling field EHT-SIG field, and a sum of a quantity of information bits of the first U-SIG field and a quantity of information bits of the first EHT-SIG field is less than or equal to 78 information bits; and a transceiver unit, configured to send an encoded first PPDU to a station.

The first U-SIG field and the first EHT-SIG field meet at least one of the following:

At least one of the first U-SIG field and the first EHT-SIG field includes an identifier indication field, where the identifier indication field is used to uniquely identify one station, for example, the identifier indication field is used to uniquely identify one station in a basic service set (BSS) including the network device;

the first U-SIG field or the first EHT-SIG field includes a PPDU format indication field, and the PPDU format indication field occupies more than 1 information bit; or the first demodulation indication field includes a spatial reuse indication field.

In this way, the technical solution of this implementation of this application can ensure that the sum of the quantity of information bits of the first U-SIG field and the quantity of information bits of the first EHT-SIG field is less than or equal to 78 information bits. This reduces indication overheads. In addition, the first U-SIG field and the first EHT-SIG field can carry more information without increasing indication overheads.

In a possible implementation, at least one of the first U-SIG field and the first EHT-SIG field includes an identifier indication field. The identifier indication field is an association identifier (AID) for uniquely identifying one station in the basic service set including the network device. In this way, an identifier indication field included in the encoded first PPDU can uniquely indicate one STA. The STA may learn, from the first U-SIG field and the first EHT-SIG field, whether the encoded first PPDU is sent to the STA, without continuing to receive a subsequent preamble data field. This reduces power consumption of the station. In addition, even if a data field following the first U-SIG field and a data field following the first EHT-SIG field are not correctly received, because the station can determine, based on the first U-SIG field and the first EHT-SIG field, that the first PPDU is sent to the station, the station may perform hybrid automatic repeat requests (HARQ) combined reception based on subsequent retransmission. Moreover, a third-party device can learn of a sender and a receiver of the first PPDU without causing interference to a device that is performing transmission. This helps the third-party device perform scheduling.

In another possible implementation, a field that indicates a PPDU format and that is included in the first U-SIG field or the first EHT-SIG field occupies more than 1 information bit. In this case, compared with a solution in which only one information bit is occupied for indicating the PPDU format, in this implementation of this application, the PPDU format indication field occupies more than 1 information bit. In this way, the PPDU format indication field can carry more information, so that more functions can be supported.

The PPDU format indication field may indicate the PPDU format and indicate that a transmission mode is SU or MU transmission. In this way, when receiving a U-SIG field of first (N−1) information bits, the station can determine whether SU transmission or MU transmission is performed, and use a corresponding reception policy.

For example, the PPDU format indication field may further include information indicating that a transmission scenario is SU, MU non-orthogonal frequency division multiple access (MU non-orthogonal frequency division multiple, MU non-OFDMA), or MU OFDMA; may further include information indicating a trigger based (trigger based, TB) frame; and may further include information indicating whether to perform puncturing.

In still another possible implementation, the first U-SIG field or the first EHT-SIG field includes a spatial reuse indication field. This can support a spatial reuse function.

Optionally, a length of the spatial reuse indication field is 2 information bits. The spatial reuse indication field may indicate any one of the following four items: an item for prohibiting parameterized spatial reuse (Parameterized Spatial reuse DISALLOW, PSR_DISALLOW), an item for prohibiting spatial reuse transmission (SR_RESTRICTED), an item for delaying spatial reuse transmission (SR_DELAY), and an item for prohibiting both PSR based spatial reuse and non-SR group (Group) overlapping basic service set (OBSS)-packet detection based spatial reuse. The spatial reuse indication field is used by the station to implement a corresponding spatial reuse function.

In some implementations, a length of a second U-SIG field of an unencoded second PPDU is equal to the quantity of information bits of the first U-SIG field, and both the quantity of information bits of the first U-SIG field and the quantity of information bits of the second U-SIG field are less than or equal to 52 information bits. The first PPDU is sent by the network device to one station when the network device performs single-user transmission, and the second PPDU is sent by the network device to a plurality of stations when the network device performs multi-user transmission. In this case, the quantity of information bits of the first U-SIG field in the first PPDU sent by the network device to the station in the SU scenario is equal to the quantity of information bits of the second U-SIG field in the second PPDU sent by the network device in the MU scenario. This can help reduce a difference between a reception policy for receiving the first U-SIG field by the station in the SU scenario and a reception policy for receiving the second U-SIG field by the station in the MU scenario, and help the station receive a U-SIG field in different scenarios.

In some implementations, the first U-SIG field and the first EHT-SIG field include an identifier indication field. The identifier indication field includes a first indication subfield and a second indication subfield. The first U-SIG field includes the first indication subfield, and the first EHT-SIG field includes the second indication subfield. In this way, idle information bits in the first U-SIG field and the first EHT-SIG field are fully used, thereby avoiding a case in which the quantity of information bits in the first U-SIG field or the first EHT-SIG field is increased because a unique station identifier needs to be indicated.

In some implementations, a start information bit of the first indication subfield is an $N^{th}$ information bit of the first U-SIG field, and a field type of first (N−1) information bits of the first U-SIG field is correspondingly the same as a field type of first (N−1) information bits of the second U-SIG field, where N is a positive integer greater than 1 and less than 35. In this way, when the station receives the first U-SIG field in the SU scenario and receives the second U-SIG field in the MU scenario, a same policy is used for receiving first parts of information bits. This helps reduce a difference between reception policies for receiving a U-SIG field by the station in different scenarios, and helps the station receive and demodulate a PPDU.

In some implementations, the field type of the first (N−1) information bits of the first U-SIG field and the field type of the first (N−1) information bits of the second U-SIG field include one or more of the following: a physical layer version indication field, an uplink/downlink indication field, a basic service set color indication field, a transmission opportunity indication field, a bandwidth indication field, a PPDU format indication field, a space-time block coding indication field, a spatial reuse indication field, a field indicating a guard interval and extremely high throughput-long training field size, a field indicating a low-density parity-check extra symbol segment, a field indicating a pre-forward error correction padding factor, a packet extension disambiguity indication field, and a preamble puncturing indication field.

In some implementations, a second EHT-SIG field of the unencoded second PPDU includes a station identifier indication field, where a field type of a field that follows the second indication subfield and that is of the first EHT-SIG field is the same as a field type of a field that follows the station identifier indication field and that is of the second EHT-SIG field. In this way, when the station receives the first U-SIG field in the SU scenario and receives the second U-SIG field in the MU scenario, a same policy is used for receiving information bits that follow the station identifier indication fields. This helps reduce a difference between reception policies for receiving a U-SIG field by the station in different scenarios, and helps the station receive and demodulate a PPDU.

In some implementations, the field type of the field that follows the second indication subfield and that is of the first EHT-SIG field and the field type of the field that follows the station identifier indication field and that is of the second EHT-SIG field include one or more of the following: a field indicating a number of space-time streams, a midamble periodicity, and Doppler, a beamforming indication field, a beam change indication field, a field indicating a modulation and coding scheme and whether dual carrier modulation is used, and a coding indication field.

In some implementations, the start information bit of the first indication subfield is the $N^{th}$ information bit of the first U-SIG field, and a field type of a field that follows an $N^{th}$ information bit and that is of the second U-SIG field and a field type of a field that is before the station identifier indication field and that is of the second EHT-SIG field include one or more of the following: a field indicating a number of EHT-SIG field symbols or a number of multi-user multiple-input multiple-output users, a field indicating an EHT-SIG field modulation and coding scheme and whether dual carrier modulation is used, a field indicating a number of extremely high throughput-long training field EHT-LTF symbols, a midamble periodicity, and Doppler, a resource unit allocation indication field, a preamble puncturing indication field, and a center 26-tone resource unit (Center 26-tone Resource Allocation, Center 26-tone RU) indication field.

In some implementations, the field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this way, information bits are saved in the foregoing manner, so that the first EHT-SIG field and the second EHT-SIG field can carry more information.

According to a fourteenth aspect, an implementation of this application further provides a network device. The network device includes:

a processing unit, configured to generate a PPDU; and a transceiver unit, configured to send the PPDU to a station. The PPDU includes an EHT-SIG field, and the EHT-SIG field includes a field indicating a number of EHT-LTF symbols, a midamble periodicity, and Doppler. The field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this case, a string group including a string is used to indicate Doppler and a midamble periodicity, and a value of the string indicates a number of EHT-LTF symbols. This can save information bits for indicating Doppler and the midamble periodicity.

According to a fifteenth aspect, an implementation of this application further provides a network device. The network device includes: a processing unit, configured to generate a PPDU; and a transceiver unit, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and a field of first (i−1) information bits of the first content channel is the same as a field of first (i−1) information bits of the second content channel, where both i and j are positive integers, and i<j; or an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel, where both i and j are positive integers, and i<j.

The field of the first (i−1) information bits of the first content channel and the field of the first (i−1) information bits of the second content channel may be understood as U-SIG overflow fields. In this case, the U-SIG overflow fields are duplicated and transmitted on the first content channel and the second content channel, so that a correct reception probability of the station can be increased.

According to a sixteenth aspect, an implementation of this application further provides a network device. The network device includes: a processing unit, configured to generate a PPDU; and a transceiver unit, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j.

In this way, a length of the first content channel is the same as a length of the second content channel. This helps the station receive the first content channel and the second content channel. In addition, the station may not read this padding field, so that a reading process of the station can be simplified.

According to a seventeenth aspect, an implementation of this application further provides a network device. The network device includes: a processing unit, configured to generate a PPDU; and a transceiver unit, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

The first content channel includes a first sub user field, the second content channel includes the second sub user field, and a user field of a first user includes the first sub user field and the second sub user field.

That is, in this implementation, a part of the user field of the same user is transmitted on the first content channel, and the other part is transmitted on the second content channel. In this way, a quantity of information bits for transmitting the user field can be increased, so that more information can be transmitted.

According to an eighteenth aspect, an implementation of this application further provides a network device. The network device includes: a processing unit, configured to generate a PPDU; and a transceiver unit, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. A user field of the first content channel is the same as a user field of the second content channel.

In this case, the user fields are duplicated and transmitted on the first content channel and the second content channel, so that a correct reception probability of the station can be increased, and reliability can be improved.

According to a nineteenth aspect, an implementation of this application further provides a station. The station includes: a transceiver unit, configured to receive a first PPDU sent by a network device; and a processing unit, configured to decode the first PPDU to obtain a decoded first PPDU. The decoded first PPDU includes a first U-SIG field and a first EHT-SIG field, and a sum of a quantity of information bits of the first U-SIG field and a quantity of information bits of the first EHT-SIG field is less than or equal to 78 information bits. The first U-SIG field and the first EHT-SIG field meet at least one of the following:

At least one of the first U-SIG field and the first EHT-SIG field includes an identifier indication field, where the identifier indication field is used to uniquely identify one station, for example, the identifier indication field is used to uniquely identify one station in a basic service set (BSS) including the network device; the first U-SIG field or the first EHT-SIG field includes a PPDU format indication field, and the PPDU format indication field occupies more than 1 information bit; or the first demodulation indication field includes a spatial reuse indication field.

In this way, the technical solution of this implementation of this application can ensure that the sum of the quantity of information bits of the first U-SIG field and the quantity of information bits of the first EHT-SIG field is less than or equal to 78 information bits. This reduces indication overheads. In addition, the first U-SIG field and the first EHT-SIG field can carry more information without increasing indication overheads, so that the station can obtain more information from the first U-SIG field and the first EHT-SIG field.

Specifically, in a possible implementation, at least one of the first U-SIG field and the first EHT-SIG field includes an identifier indication field. The identifier indication field is an association identifier (AID) for uniquely identifying one station. In this way, an identifier indication field included in the encoded first PPDU can uniquely indicate one STA. The STA may learn, from the first U-SIG field and the first EHT-SIG field, whether the encoded first PPDU is sent to the STA, without continuing to receive a subsequent preamble data field. This reduces power consumption of the station. In addition, even if a data field following the first U-SIG field and a data field following the first EHT-SIG field are not correctly received, because the station can determine, based on the first U-SIG field and the first EHT-SIG field, that the first PPDU is sent to the station, the station may perform hybrid automatic repeat requests (HARQ) combined reception based on subsequent retransmission. Moreover, a third-party device can learn of a sender and a receiver of the first PPDU without causing interference to a device that is performing transmission. This helps the third-party device perform scheduling.

In another possible implementation, a field that indicates a PPDU format and that is included in the first U-SIG field or the first EHT-SIG field occupies more than 1 information bit. In this case, compared with a solution in which only one information bit is occupied for indicating the PPDU format, in this implementation of this application, the PPDU format indication field occupies more than 1 information bit. In this way, the PPDU format indication field can carry more information, so that more functions can be supported.

The PPDU format indication field may indicate the PPDU format and indicate that a transmission mode is SU or MU transmission. In this way, when receiving a U-SIG field of first (N−1) information bits, the station can determine whether SU transmission or MU transmission is performed, and use a corresponding reception policy.

For example, the PPDU format indication field may further include information indicating that a transmission scenario is SU, MU non-orthogonal frequency division multiple access (MU non-orthogonal frequency division multiple, MU non-OFDMA), or MU OFDMA; may further include information indicating a trigger based (TB) frame; and may further include information indicating whether to perform puncturing.

In still another possible implementation, the first U-SIG field or the first EHT-SIG field includes a spatial reuse indication field. This can support a spatial reuse function.

Optionally, a length of the spatial reuse indication field is 2 information bits. The spatial reuse indication field may indicate any one of the following four items: an item for prohibiting parameterized spatial reuse (Parameterized Spatial reuse DISALLOW, PSR_DISALLOW), an item for prohibiting spatial reuse transmission (SR_RESTRICTED), an item for delaying spatial reuse transmission (SR_DELAY), and an item for prohibiting both PSR based spatial reuse and non-SR group (Group) overlapping basic service set (OBSS)-packet detection based spatial reuse. The spatial reuse indication field is used by the station to implement a corresponding spatial reuse function.

In some implementations, a length of a second U-SIG field in the decoded second PPDU is equal to a quantity of information bits of the first U-SIG field, and both the quantity of information bits of the first U-SIG field and the quantity of information bits of the second U-SIG field are less than or equal to 52 information bits. The first PPDU is sent by the network device to one station when the network device performs single-user transmission, and the second PPDU is sent by the network device to a plurality of stations when the network device performs multi-user transmission. In this case, the quantity of information bits of the first U-SIG field in the first PPDU sent by the network device to the station in the SU scenario is equal to the quantity of information bits of the second U-SIG field in the second PPDU sent by the network device in the MU scenario. This can help reduce a difference between a reception policy for receiving the first U-SIG field by the station in the SU scenario and a reception policy for receiving the second U-SIG field by the station in the MU scenario, and help the station receive a U-SIG field in different scenarios.

In some implementations, the first U-SIG field and the first EHT-SIG field include an identifier indication field. The identifier indication field includes a first indication subfield and a second indication subfield. The first U-SIG field includes the first indication subfield, and the first EHT-SIG field includes the second indication subfield. In this way, idle information bits in the first U-SIG field and the first EHT-SIG field are fully used, thereby avoiding a case in which the quantity of information bits in the first U-SIG field or the first EHT-SIG field is increased because a unique station identifier needs to be indicated.

In some implementations, a start information bit of the first indication subfield is an $N^{th}$ information bit of the first U-SIG field, and a field type of first (N−1) information bits of the first U-SIG field is correspondingly the same as a field type of first (N−1) information bits of the second U-SIG field, where N is a positive integer greater than 1 and less than 35. In this way, when the station receives the first U-SIG field in the SU scenario and receives the second U-SIG field in the MU scenario, a same policy is used for receiving first parts of information bits. This helps reduce a difference between reception policies for receiving a U-SIG field by the station in different scenarios, and helps the station receive and demodulate a PPDU.

In some implementations, the field type of the first (N−1) information bits of the first U-SIG field and the field type of the first (N−1) information bits of the second U-SIG field include one or more of the following: a physical layer version indication field, an uplink/downlink indication field, a basic service set color indication field, a transmission opportunity indication field, a bandwidth indication field, a PPDU format indication field, a space-time block coding indication field, a spatial reuse indication field, a field indicating a guard interval and extremely high throughput-long training field size, a field indicating a low-density parity-check extra symbol segment, a field indicating a pre-forward error correction padding factor, a packet extension disambiguity indication field, and a preamble puncturing indication field.

In some implementations, a second EHT-SIG field of the unencoded second PPDU includes a station identifier indication field, where a field type of a field that follows the second indication subfield and that is of the first EHT-SIG field is the same as a field type of a field that follows the station identifier indication field and that is of the second EHT-SIG field. In this way, when the station receives the first U-SIG field in the SU scenario and receives the second U-SIG field in the MU scenario, a same policy is used for receiving information bits that follow the station identifier indication fields. This helps reduce a difference between reception policies for receiving a U-SIG field by the station in different scenarios, and helps the station receive and demodulate a PPDU.

In some implementations, the field type of the field that follows the second indication subfield and that is of the first EHT-SIG field and the field type of the field that follows the station identifier indication field and that is of the second EHT-SIG field include one or more of the following: a field indicating a number of space-time streams, a midamble periodicity, and Doppler, a beamforming indication field, a beam change indication field, a field indicating a modulation and coding scheme and whether dual carrier modulation is used, and a coding indication field.

In some implementations, the start information bit of the first indication subfield is the $N^{th}$ information bit of the first U-SIG field, and a field type of a field that follows an $N^{th}$ information bit and that is of the second U-SIG field and a field type of a field that is before the station identifier indication field and that is of the second EHT-SIG field include one or more of the following: a field indicating a number of EHT-SIG field symbols or a number of multi-user multiple-input multiple-output users, a field indicating an EHT-SIG field modulation and coding scheme and whether dual carrier modulation is used, a field indicating a number of extremely high throughput-long training field EHT-LTF symbols, a midamble periodicity, and Doppler, a resource unit allocation indication field, a preamble puncturing indication field, and a center 26-tone resource unit (Center 26-tone Resource Allocation, Center 26-tone RU) indication field.

In some implementations, the field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this way, information bits are saved in the foregoing manner, so that the first EHT-SIG field and the second EHT-SIG field can carry more information, and the station obtains more information.

According to a twentieth aspect, an implementation of this application further provides a station, including a processing unit and a transceiver unit.

The transceiver unit is configured to receive a PPDU sent by a network device.

The PPDU includes an EHT-SIG field, and the EHT-SIG field includes a field indicating a number of EHT-LTF symbols, a midamble periodicity, and Doppler. The field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this way, the station determines Doppler and a midamble periodicity based on a string group including a string, and indicates a number of EHT-LTF symbols based on a value of the string. In this case, a quantity of information bits of a field indicating a number of EHT-LTF symbols, Doppler, and a midamble periodicity is reduced. In this way, the PPDU can carry more other information, so that the station can obtain more information from the PPDU.

According to a twenty-first aspect, an implementation of this application further provides a station, including a processing unit and a transceiver is unit.

The transceiver unit is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and a field of first (i−1) information bits of the first content channel is the same as a field of first (i−1) information bits of the second content channel, where both i and j are positive integers, and i<j; or an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel, where both i and j are positive integers, and i<j.

According to a twenty-second aspect, an implementation of this application further provides a station, including a processing unit and a transceiver unit.

The transceiver unit is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j.

According to a twenty-third aspect, an implementation of this application further provides a station, including a processing unit and a transceiver unit.

The transceiver unit is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

The first content channel includes a first sub user field, the second content channel includes the second sub user field, and a user field of a first user includes the first sub user field and the second sub user field.

According to a twenty-fourth aspect, an implementation of this application further provides a station, including a processing unit and a transceiver unit.

The transceiver unit is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

A user field of the first content channel is the same as a user field of the second content channel.

According to a twenty-fifth aspect, an implementation of this application further provides a network device, including a processor. The processor is coupled to a memory. When the processor executes a computer program or instructions in the memory, the method in any one of the implementations of the first aspect is performed, or the method in any one of the second aspect to the sixth aspect is performed.

According to a twenty-sixth aspect, an implementation of this application further provides a station, including a processor. The processor is coupled to a memory. When the processor executes a computer program or instructions in the memory, the method in any implementation of the seventh aspect is performed, or the method in any one of the eighth aspect to the twelfth aspect is performed.

According to a twenty-seventh aspect, an implementation of this application further provides a computer-readable storage medium. The computer-readable storage medium stores computer instructions. The computer instructions instruct a network device to perform the method in any one of the implementations of the first aspect, the computer instructions instruct a network device to perform the method in any one of the second aspect to the sixth aspect, or the computer instructions instruct a station to perform the method in any one of the implementations of the seventh aspect, or the computer instructions instruct a station to perform the method in any one of the eighth aspect to the twelfth aspect.

According to a twenty-eighth aspect, an implementation of this application further provides a computer program product. The computer program product includes a computer program. When the computer program runs on a computer, the computer is enabled to perform the method in any one of the implementations of the first aspect, the computer is enabled to perform the method in any one of the second aspect to the sixth aspect, the computer is enabled to perform the method in any one of the implementations of the seventh aspect, or the computer is enabled to perform the method in any one of the eighth aspect to the twelfth aspect.

According to a twenty-ninth aspect, an implementation of this application further provides a communication device, including an input circuit, an output circuit, and a processing circuit. The processing circuit is configured to: receive a signal through the input circuit, and transmit a signal through the output circuit, to implement a part or all of the steps in any one of the methods that may be performed by the network device or the station in embodiments of this application.

In a specific implementation process, the communication device may be a chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. A specific implementation of the processor and various circuits is not limited in this application.

DETAILED DESCRIPTION OF ILLUSTRATIVE EMBODIMENTS

The following describes technical solutions of this application with reference to accompanying drawings.

Names of a first EHT-SIG field and a second EHT-SIG field in implementations of this application are determined according to the 802.11be standard. The names of the first EHT-SIG field and the second EHT-SIG field in implementations of this application may alternatively be names of related SIG fields in other standard versions. The first EHT-SIG field and the second EHT-SIG field in implementations of this application are not limited to SIG fields related to the 802.11be standard. The first EHT-SIG field and the second EHT-SIG field in implementations of this application may be used to indicate SIG fields related to any standard version.

Figure 1:
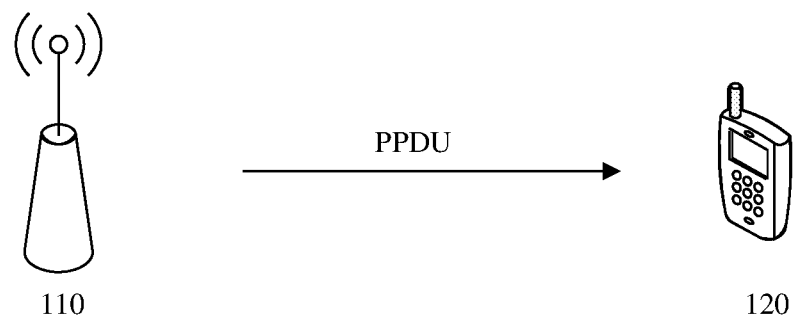
FIG. 1 is a schematic diagram of a network architecture of a communication system according to an embodiment of this application.

FIG. 1 is a schematic diagram of a network architecture of a communication system in an SU transmission scenario. The communication system 100 includes a network device no and a STA 120.

The network device no sends a PPDU to the STA 120. The STA 120 receives the PPDU, and demodulates data in the PPDU based on a U-SIG field and an EHT-SIG field in the PPDU.

Figure 2:
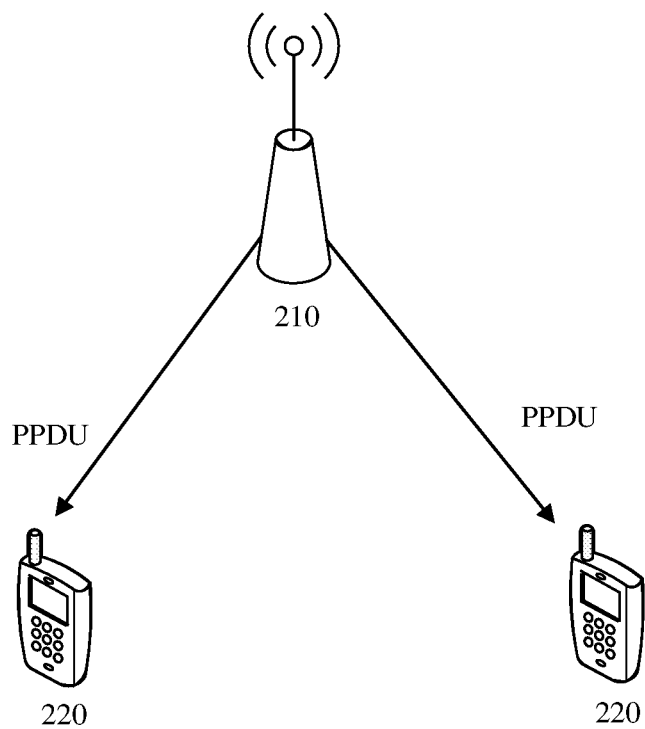
FIG. 2 is a schematic diagram of a network architecture of another communication system according to an embodiment of this application.

FIG. 2 is a schematic diagram of a network architecture of a communication system in an MU transmission scenario. The communication system 200 includes a network device 210 and a plurality of STAs 220. The network device 210 sends a PPDU to the plurality of STAs 220. The STA receives the PPDU and demodulates data in the PPDU based on a U-SIG field and an EHT-SIG field in the PPDU.

Regardless of in SU transmission or MU transmission, a PPDU sent by the network device to a station includes a U-SIG field and an EHT-SIG field.

The STA is a logical entity that has medium access control and physical layer functions of IEEE 802.11, and is a general term of an access point and a non-access point station (non-AP STA).

Table 1 shows a field included in a U-SIG field in a conventional implementation and a quantity of information bits of each field. Table 2 shows a field included in an EHT-SIG field in a conventional implementation and a quantity of information bits of each field.

TABLE 1

| Information bit | Field |
| --- | --- |
| B0-B2 (U-SIG-1) | Physical layer version indication |
| B3 | Uplink/downlink indication |
| B4-B9 | Basic service set color indication |
| B10-B16 | Transmission opportunity |
| B17-B22 | Bandwidth |
| B23 | PPDU format |
| B24-B25 | Guard interval and EHT-LTF size |
| B0-B3 (U-SIG-2) | Number of EHT-LTFs symbols and midamble periodicity |
| B4-B6 | Modulation and coding scheme used for an EHT-SIG field and whether dual carrier modulation is used |
| B7-B10 | Number of MU-MIMO users or number of EHT-SIG field symbols |
| B11 | Low-density parity-check extra symbol segment |
| B12 | Space-time block coding |
| B13-B14 | Pre-forward error correction padding factor |
| B15 | Packet extension disambiguity? |
| B16-B19 | Cyclic redundancy code |
| B20-B25 | Tail bits |

TABLE 2

| Information bit | Field |
| --- | --- |
| B0-B5 | Partial station identifiers |
| B6-B7 | Number of space-time streams |
| B8 | Beamformed? |
| B9 | Beam change |
| B10-B14 | Modulation and coding scheme and dual carrier modulation |
| B15 | Coding |
| B16-B19 | Cyclic redundancy code |
| B20-B25 | Tail bits |

It can be learned that in the foregoing conventional implementation, fields included in a U-SIG field and a quantity of information bits of each field in an SU transmission scenario are the same as those in an MU transmission scenario. Similarly, fields included in the EHT-SIG field and a quantity of information bits of each field in the SU transmission scenario are the same as those in the MU transmission scenario.

Figure 3:
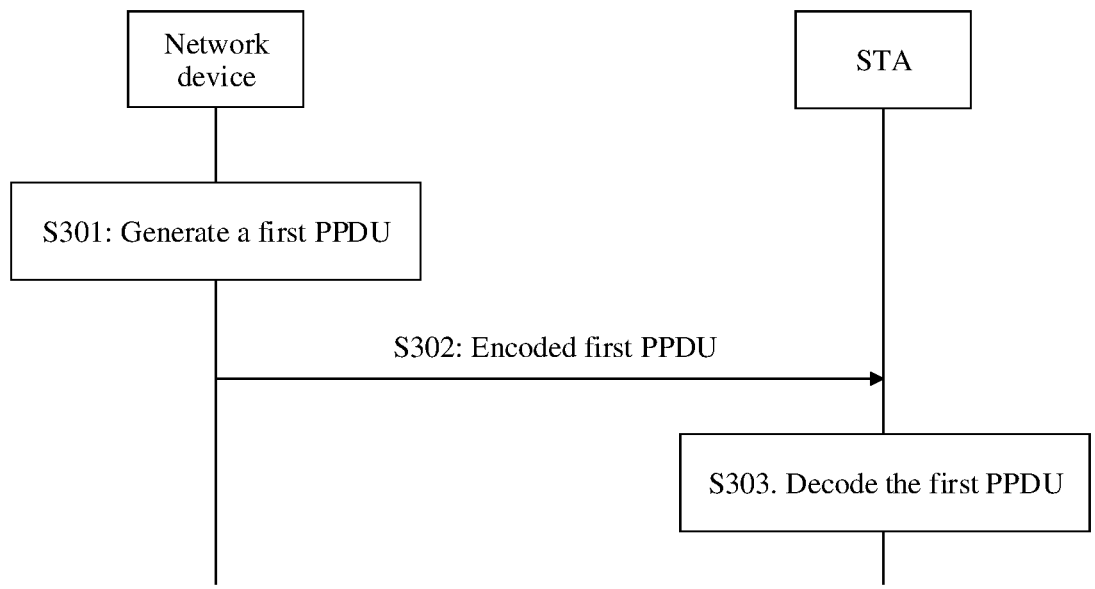
FIG. 3 is a schematic flowchart of a data transmission method according to an embodiment of this application.

Refer to FIG. 3. FIG. 3 is a schematic flowchart of a data transmission method according to an embodiment of this application. The data transmission method includes the following steps.

S301: A network device generates a first PPDU.

The first PPDU includes a first universal-Signaling field U-SIG field and a first extremely high throughput-Signaling field EHT-SIG field, and a sum of a quantity of information bits of the first U-SIG field and a quantity of information bits of the first EHT-SIG field is less than or equal to 78 information bits.

S302: The network device sends an encoded first PPDU to a STA.

It may be understood that, in step S301, the PPDU generated by the network device is an unencoded PPDU.

The first U-SIG field and the first EHT-SIG field are not encoded, either. A quantity of information bits is a quantity of unencoded bits. The sum of the quantity of bits of the unencoded first U-SIG field and the quantity of information bits of the first EHT-SIG field is less than or equal to 78 information bits. After generating the first PPDU, the network device may encode the first PPDU, and then send the encoded first PPDU to the STA.

After the first PPDU is encoded, a quantity of bits occupied by each field in the first PPDU changes. For example, encoding is performed by using an MCS 0, and the MCS 0 is binary phase shift keying (BPSK) modulation with a coding rate of ½. In this case, a sum of quantities of bits of the first U-SIG field and the first EHT-SIG field in the encoded first PPDU is 156 bits, that is, a total of three orthogonal frequency division multiplexing (OFDM) symbols. When another modulation scheme and another coding rate are used, the 156 bits may also be described as an equivalent symbol quantity.

S303: The STA decodes the first PPDU to obtain a decoded first PPDU, where the decoded first PPDU includes a first U-SIG field and a first EHT-SIG field.

The first U-SIG field and the first EHT-SIG field meet at least one of the following: At least one of the first U-SIG field and the first EHT-SIG field includes an identifier indication field, where the identifier indication field is used to uniquely identify one STA; a field that indicates a PPDU format and that is included in the first U-SIG field or the first EHT-SIG field occupies more than 1 information bit; or the first U-SIG field or the first EHT-SIG field includes a spatial reuse indication field.

In the conventional technical solution corresponding to FIG. 2, fields included in a U-SIG field and a quantity of information bits of each field in the SU transmission are the same as those in the MU transmission scenario, and some fields required during MU transmission are not required in the SU scenario. Consequently, an overhead waste is caused and transmission resources cannot be fully used. In this way, compared with the conventional technical solution, the technical solution of this embodiment of this application can ensure that the sum of the quantity of information bits of the first U-SIG field and the quantity of information bits of the first EHT-SIG field is less than or equal to 78 information bits. This can reduce indication overheads. In addition, the first U-SIG field and the first EHT-SIG field can carry more information without increasing indication overheads.

Specifically, in an example, at least one of the first U-SIG field and the first EHT-SIG field includes an identifier indication field. The identifier indication field is used to uniquely identify one STA. Specifically, the identifier indication field is specifically an association identifier (AID), and the AID may uniquely identify or indicate one station. The station is a station in a basic service set (BSS) including the network device. In this way, the encoded first PPDU includes an identifier indication field used to indicate a unique STA. The STA may learn, from the first U-SIG field and the first EHT-SIG field, whether the encoded first PPDU is sent to the STA, without continuing to receive a subsequent preamble data field. This reduces power consumption of the STA. In addition, even if a data field following the first U-SIG field and a data field following the first EHT-SIG field are not correctly received, because the STA can determine, based on the first U-SIG field and the first EHT-SIG field, that the first PPDU is sent to the STA, the STA may perform HARQ combined reception based on subsequent retransmission. Moreover, a third-party device can learn of a sender and a receiver of the first PPDU without causing interference to a device that is performing transmission. This helps the third-party device perform scheduling.

Specifically, that at least one of the first U-SIG field and the first EHT-SIG field includes an identifier indication field may be understood as: The first U-SIG field includes the identifier indication field; the first EHT-SIG field includes the identifier indication field; or the first U-SIG field and the first EHT-SIG field include the identifier indication field, where the first U-SIG field includes a part of the identifier indication field, and the first EHT-SIG field includes another part of the identifier indication field.

The identifier indication field may indicate a unique STA. For example, when the network device sends the first PPDU to one STA in an SU transmission scenario, the identifier indication field can uniquely indicate the one STA.

Specifically, the identifier indication field has 11 information bits. In this way, the information bits in the identifier indication field can meet a requirement on an information bit for uniquely identifying one STA.

In another example, a field that indicates a PPDU format and that is included in the first U-SIG field or the first EHT-SIG field occupies more than 1 information bit. In this case, compared with a solution in which only one information bit is occupied for indicating the PPDU format, in this embodiment of this application, the PPDU format indication field occupies more than 1 information bit. In this way, the PPDU format indication field can carry more information, so that more functions can be supported.

For example, the PPDU format indication field may further include information indicating that a transmission scenario is SU, MU non-orthogonal frequency division multiple access (MU non-orthogonal frequency division multiple, MU non-OFDMA), or MU OFDMA; may further include information indicating a trigger based (TB) frame; and may further include information indicating whether to perform puncturing.

Further, the PPDU format indication field may indicate a PPDU format and indicate that a transmission mode is SU or MU transmission. In this way, when receiving the U-SIG field of the first (N−1) information bits, the STA can determine whether SU transmission or MU transmission is performed, and use a corresponding reception policy.

In still another example, the first U-SIG field or the first EHT-SIG field includes a spatial reuse indication field. This can support a spatial reuse function.

Specifically, the spatial reuse indication field may indicate any one of the following four items: an item for prohibiting parameterized spatial reuse (parameterized Spatial reuse disallow, PSR_DISALLOW), an item for prohibiting spatial reuse transmission (SR_RESTRICTED), an item for delaying spatial reuse transmission (SR_DELAY), and an item for prohibiting both PSR based spatial reuse and non-SR group (group) overlapping basic service set (OBSS)-packet detection based spatial reuse.

Optionally, the first EHT-SIG field may be encoded by using a coding scheme agreed on by the network device and the STA. For example, a used modulation and coding scheme (MCS) is an MSC 0, and dual carrier modulation (DCM) is not used. In this way, the first U-SIG field does not include an MCS and DCM indication field of an EHT-SIG field, so that information bits can be saved, and the saved information bits are used to carry other important information. The agreed coding scheme may be, for example, a coding scheme specified in a protocol.

In some embodiments, a length of a second U-SIG field of an unencoded second PPDU is equal to the quantity of information bits of the first U-SIG field, and both the quantity of information bits of the first U-SIG field and the quantity of information bits of the second U-SIG field are less than or equal to 52 information bits. The first PPDU is sent by the network device to the STA when the network device performs single-user transmission, and the second PPDU is sent by the network device to a plurality of STAs when the network device performs multi-user transmission.

It can be learned that the quantity of information bits of the first U-SIG field in the first PPDU sent by the network device to the STA in the SU scenario is equal to the quantity of information bits of the second U-SIG field in the second PPDU sent by the network device in the MU scenario. This can help reduce a difference between a reception policy for receiving the first U-SIG field by the STA in the SU scenario and a reception policy for receiving the second U-SIG field by the STA in the MU scenario, and help the STA receive a U-SIG field in different scenarios.

In addition, in this embodiment of this application, both the quantity of information bits of the first U-SIG field and the quantity of information bits of the second U-SIG field are less than or equal to 52 information bits. One OFDM symbol includes 52 information bits. A smaller quantity of information bits of the first U-SIG field and the second U-SIG field indicates a smaller quantity of information bits of the encoded first U-SIG field and the encoded second U-SIG field. In this case, in the encoded first PPDU, OFDM symbols occupied by the U-SIG fields are also reduced, so that a wireless transmission resource can be saved.

In some embodiments, the first U-SIG field and the first EHT-SIG field include an identifier indication field. The identifier indication field includes a first indication subfield and a second indication subfield. The first U-SIG field includes the first indication subfield, and the first EHT-SIG field includes the second indication subfield. In this case, the identifier indication field is divided into two parts. The first U-SIG field includes one part, and the first EHT-SIG field includes the other part. In this way, idle bits in the first U-SIG field and the first EHT-SIG field are fully used, thereby avoiding a case in which the quantity of information bits in the first U-SIG field or the first EHT-SIG field is increased because a unique STA needs to be indicated.

In some optional embodiments, a start information bit of the first indication subfield is an $N^{th}$ information bit of the first U-SIG field, and a field type of first (N−1) information bits of the first U-SIG field is correspondingly the same as a field type of first (N−1) information bits of the second U-SIG field, where N is a positive integer greater than 1 and less than 35. In other words, a field type of a field that is before the first indication subfield and that is of the first U-SIG field is the same as a field type of first (N−1) information bits at a corresponding location of the second U-SIG field. In this way, when the STA receives the first U-SIG field in the SU scenario and receives the second U-SIG field in the MU scenario, a same policy is used for receiving first parts of information bits. This helps reduce a difference between reception policies for receiving a U-SIG field by the STA in different scenarios, and helps the STA receive a PPDU.

In some other optional embodiments, a second EHT-SIG field of the unencoded second PPDU includes an AID indication field, where a field type of a field that follows the second indication subfield and that is of the first EHT-SIG field is the same as a field type of a field that follows the AID indication field and that is of the second EHT-SIG field. In this way, when the STA receives the first U-SIG field in the SU scenario and receives the second U-SIG field in the MU scenario, a same policy is used for receiving information bits of the field that follows the second indication subfield and information bits that follow the AID indication field. This helps reduce a difference between reception policies for receiving a U-SIG field by the STA in different scenarios, and helps the STA receive the PPDU.

It should be noted that the foregoing two optional embodiments may be combined. For example, a start information bit of the first indication subfield is an $N^{th}$ information bit of the first U-SIG field, and a field type of first (N−1) information bits of the first U-SIG field is correspondingly the same as a field type of first (N−1) information bits of the second U-SIG field, where N is a positive integer greater than 1 and less than 35. A second EHT-SIG field of the unencoded second PPDU includes a STA indication field. A field type of a field that follows the second indication subfield and that is of the first EHT-SIG field is the same as a field type of a field that follows the STA indication field and that is of the second EHT-SIG field. In this way, when the STA receives the first U-SIG field in the SU scenario and receives the second U-SIG field in the MU scenario, a same policy is used for receiving information bits of the field that follows the second indication subfield and information bits that follow the STA indication field. This helps reduce a difference between reception policies for receiving a U-SIG field by the STA in different scenarios, and helps the STA receive a PPDU. The STA indication field may be, for example, an AID used to uniquely identify one STA.

In this embodiment of this application, both the first PPDU and the second PPDU that are sent by the network device are an encoded PPDU. Each of the first U-SIG field, the second U-SIG field, the first EHT-SIG field, and the second EHT-SIG field mentioned in this embodiment of this application is a field of an unencoded PPDU.

Specifically, the field type of the first (N−1) information bits of the first U-SIG field and the field type of the first (N−1) information bits of the second U-SIG field include one or more of the following: a physical layer version (version identifier) indication field, an uplink/downlink (UL/DL) indication field, a basic service set color indication field (basic service set color, BSS color) indication field, a transmission opportunity (TXOP) indication field, a bandwidth indication field, a PPDU format indication field, a space-time block coding (space time block code, STBC) indication field, a spatial reuse indication field, a guard interval (GI) and extremely high throughput-long training field size (EHT-LTF Size) indication field, a field indicating a low-density parity-check extra symbol segment (LDPC extra symbol segment), a pre-forward error correction padding factor (Pre-FEC Padding Factor) indication field, a packet extension disambiguity (PE disambiguity) indication field, or a preamble puncturing (preamble puncture) indication field.

Specifically, the UL/DL indication field indicates UL or DL. The version identifier indication field specifically indicates a specific PPDU version of the first PPDU. The BSS color indication field specifically indicates a color identifier of a BSS including a network device. The bandwidth indication field specifically indicates a bandwidth of a packet and preamble puncturing information. The PPDU format indication field specifically indicates a PPDU format. The STBC indication field specifically indicates whether space-time block coding is used for a data part. The PE disambiguity indication field specifically indicates whether packet extension disambiguity exists.

When the PPDU format indication field has more than 1 information bit, the PPDU format indication field may further include information indicating that a transmission scenario is SU, MU non-OFDMA, or MU OFDMA; may further include information indicating a trigger based (TB) frame; and may further include information indicating whether to perform puncturing.

The PPDU format indication field may perform indication in combination with the UL/DL indication field. If the UL/DL indication field indicates DL, the PPDU format indication field may indicate SU, MU non-OFDMA, or MU OFDMA; or if the UL/DL indication field indicates UL, the PPDU format indication field may indicate a TB or null.

Alternatively, if the UL/DL indication field indicates UL, the PPDU format indication field indicates that a transmission scenario is SU nonpunctured (SU non-punctured), SU punctured, MU non-OFDMA, or MU OFDMA; or if the UL/DL indication field indicates UL, the PPDU format indication field may indicate that a transmission scenario is an SU non-punctured string or an SU punctured string, or indicate a TB.

For example, there are 2 information bits in the PPDU format indication field. The PPDU format indication field may include any one of binary values corresponding to 0 to 3. If the UL/DL indication field indicates DL, 00 indicates that a transmission scenario is SU, 01 indicates that the transmission scenario is MU non-OFDMA, 10 indicates that the transmission scenario is MU OFDMA, and 11 may be used as a reserved string. Alternatively, if the UL/DL indication field indicates UL, 00 indicates that a transmission scenario is SU, 01 indicates a TB, and 10 and 11 are reserved strings.

Alternatively, if the UL/DL indication field indicates DL, 00 indicates that a transmission scenario is SU non-punctured, 01 indicates that the transmission scenario is SU punctured, 10 indicates that the transmission scenario is MU non-OFDMA, and 11 indicates that the transmission scenario is MU OFDMA. Alternatively, if the UL/DL indication field indicates UL, 00 indicates that a transmission scenario is SU non-punctured, 01 indicates that the transmission scenario is SU punctured, 10 indicates a TB, and 11 is a reserved string.

The field type of the field that follows the second indication subfield and that is of the first EHT-SIG field and the field type of the field that follows the STA indication field and that is of the second EHT-SIG field include one or more of the following: a field indicating a number of space-time streams (NSTSs), a midamble periodicity, and Doppler, a beamforming (beamformed) indication field, a beam change indication field, a field indicating a modulation and coding scheme (MCS) and whether dual coding modulation (DCM) is used, and a coding indication field (coding).

Specifically, the field indicating an NSTS, a midamble periodicity, and Doppler is used to indicate a quantity of space-time streams of one STA based on a midamble periodicity and Doppler. The beamformed indication field specifically indicates whether beamforming is used. The beam change indication field specifically indicates whether a beam change is performed on a packet. The MCS and DCM indication field indicates a modulation and coding scheme of a STA and whether dual carrier modulation is used for a data part. The coding indication field specifically indicates a coding scheme.

A field type of a field that follows the $N^{th}$ information bit and that is of the second U-SIG field and a field type of a field that is before the STA indication field and that is of the second EHT-SIG field include one or more of the following: a field indicating a number of EHT-LTF symbols or multi-user multiple-input multiple-output users (MU-MIMO users), an EHT-SIG MCS and DCM indication field, a field indicating a number of extremely high throughput-long training field symbols (number of EHT-LTF symbols), a midamble periodicity, and Doppler, a resource unit allocation indication field (resource unit allocation subfield, RU allocation subfield), a preamble puncturing indication field, and a center 26-tone resource unit (Center 26-tone RU) indication field.

The field indicating a number of EHT-LTF symbols, a midamble periodicity, and Doppler may include a subfield indicating a number of EHT-LTF symbols, a subfield indicating a midamble periodicity, and a subfield indicating Doppler; or may indicate a number of EHT-LTF symbols, a midamble periodicity, and Doppler by using one field.

Specifically, the field indicating a number of EHT-LTF symbols or MU-MIMO users specifically indicates a number of MU-MIMO users when an EHT-SIG field is in a compressed mode, or indicate a number of EHT-SIG field symbols when an EHT-SIG field is in a non-compressed mode. The EHT-SIG MCS and DCM indication field specifically indicates a modulation and coding scheme of a second EHT-SIG field and whether dual carrier modulation is used for the second EHT-SIG field. The field indicating a number of EHT-LTF symbols, a midamble periodicity, and Doppler specifically indicates a number of EHT-LTF symbols, a midamble periodicity, and whether Doppler exists.

Figure 4A:
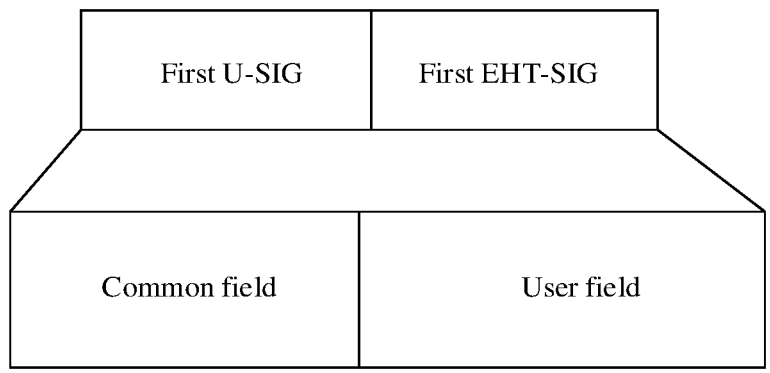
FIG. 4A is a schematic diagram of a structure of a first U-SIG field and a first EHT-SIG field according to an embodiment of this application.
Figure 4B:
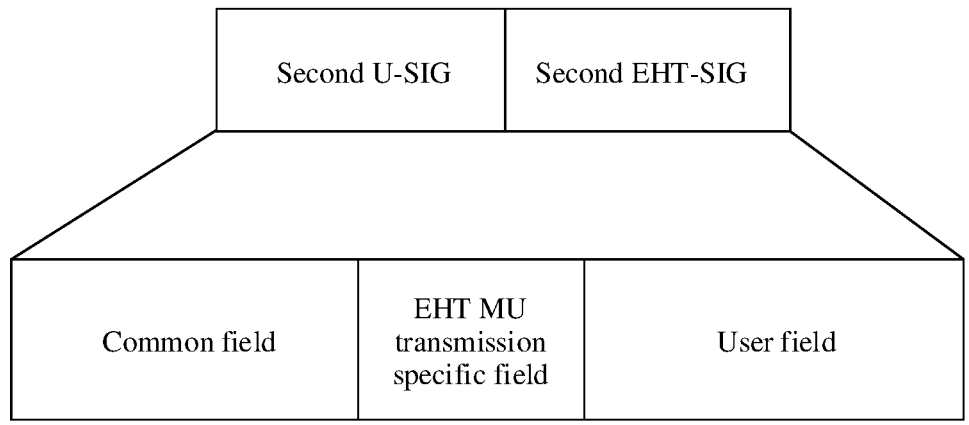
FIG. 4B is a schematic diagram of a structure of a second U-SIG field and a second EHT-SIG field according to an embodiment of this application.

Refer to FIG. 4A. FIG. 4A is a schematic diagram of a structure of a first U-SIG field and a first EHT-SIG field according to an embodiment of this application. The first U-SIG field and the first EHT-SIG field include a common field and a user field. Refer to FIG. 4B. FIG. 4B is a schematic diagram of a structure of a second U-SIG field and a second EHT-SIG field according to an embodiment of this application. The second U-SIG field and the second EHT-SIG field include a common field, an EHT MU transmission specific field, and a plurality of user fields. The EHT MU transmission specific field may include but is not limited to a field indicating a number of EHT-SIG field symbols, an EHT-SIG MCS, and EHT-SIG field DCM, and an RU allocation subfield. The field indicating a number of EHT-SIG field symbols, an EHT-SIG MCS, and EHT-SIG field DCM may be a field indicating a number of EHT-SIG field symbols, an EHT-SIG MCS indication field, and an EHT-SIG field DCM indication field. The RU allocation subfield is optional. In an OFDMA transmission scenario, the second U-SIG field and the second EHT-SIG field include the RU allocation subfield.

A field type and a quantity of information bits of the common field included in the first U-SIG field and the first EHT-SIG field in FIG. 4A are correspondingly the same as those included in the common field included in the second U-SIG field and the second EHT-SIG field in FIG. 4B. The common field may be a field of first (N−1) information bits of the first U-SIG field or a field of first (N−1) information bits of the second U-SIG field.

Specifically, the common field included in the first U-SIG field and the first EHT-SIG field may include: a version identifier indication field, an UL/DL indication field, a BSS color indication field, a TXOP indication field, a bandwidth indication field, a PPDU format indication field, an STBC indication field, a spatial reuse indication field, a GI and EHT-LTF size indication field, a field indicating an LDPC extra symbol segment, a field indicating a pre-FEC padding factor, and a PE disambiguity indication field.

A field type of the user field included in the first U-SIG field and the first EHT-SIG field in FIG. 4A is the same as that of the user field included in each user field group included in the second U-SIG field and the second EHT-SIG field in FIG. 4B.

Specifically, the user field in FIG. 4A includes a first indication subfield in the first U-SIG field, a second indication subfield in the first EHT-SIG field, a field indicating an NSTS, a midamble periodicity, and Doppler, a beamformed indication field, a beam change indication field, an MCS and DCM indication field, and a coding indication field.

The user field in FIG. 4B includes a STA indication field, a field indicating an NSTS, a midamble periodicity, and Doppler, a beamformed indication field, a beam change indication field, an MCS and DCM indication field, and a coding indication field.

It can be learned that, in this embodiment of this application, a main difference of the first U-SIG field and the first EHT-SIG field from the second U-SIG field and the second EHT-SIG field lies in that the first U-SIG field and the first EHT-SIG field do not include an EHT MU transmission specific field, where this field is not required in an SU transmission scenario. In this way, a structure of the first U-SIG field and the first EHT-SIG field in this embodiment of this application is more proper.

In this case, this field that is not required in the SU transmission scenario is omitted, and the first U-SIG field and the first EHT-SIG field may include other more useful information, so that transmission resources can be fully used in the SU transmission scenario.

In addition, in this application, a format of the first U-SIG field and the first EHT-SIG field is partially the same as that of the second U-SIG field and the second EHT-SIG field. In this way, a difference between a reception policy for receiving the first U-SIG field and the first EHT-SIG field by the STA in the SU transmission scenario and a reception policy for receiving the second U-SIG field and the second EHT-SIG field in the MU transmission scenario can be better controlled.

In a specific example, for fields included in the first U-SIG field and fields included in the second U-SIG field, refer to Table 3 and Table 4. Table 3 shows fields of first 26 information bits of the first U-SIG field and the second U-SIG field, and a quantity of information bits occupied by each field. Table 4 shows fields of a $27^{th}$ information bit to a $52^{nd}$ information bit of the first U-SIG field and the second U-SIG field, and a quantity of information bits occupied by each field.

TABLE 4

| First U-SIG field | | Second U-SIG field | |
|---|---|---|---|
| Information bit (Bit) | Field | Information bit (Bit) | Field |
| B0-B1 | Spatial reuse | B0-B1 | Spatial reuse |
| B2-B3 | Guard interval and EHT-LTF size (GI + EHT-LTF size) | B2-B3 | Guard interval and EHT-LTF size (GI + EHT-LTF size) |
| B4 | Low-density parity-check extra symbol segment (LDPC extra symbol segment) | B4 | Low-density parity-check extra symbol segment (LDPC extra symbol segment) |
| B5 | Packet extension disambiguity (PE disambiguity) | B5 | Packet extension disambiguity (PE disambiguity) |
| B6-B7 | Pre-forward error correction padding factor (Pre-FEC padding factor) | B6-B7 | Pre-forward error correction padding factor (Pre-FEC padding factor) |
| B8-B15 | Partial AID | B8-B12 | Number of EHT-SIG field symbols or multi-user multiple-input multiple-output users (number of EHT-SIG field symbols or MU-MIMO users) |
| | | B13-B15 | EHT-SIG field modulation and coding scheme and dual carrier modulation (EHT-SIG MCS and DCM) |
| B16-B19 | Cyclic redundancy code (CRC) | B16-B19 | Cyclic redundancy code (CRC) |
| B20-B25 | Tail bits (tail) | B20-B25 | Tail bits (tail) |

As shown in Table 3 and Table 4, content of first 34 information bits (B0-B25 in Table 3 and B0-B7 in Table 4) of the first U-SIG field is the same as that of the second U-SIG field. A $1^{st}$ information bit corresponds to B0, a $2^{nd}$ information bit corresponds to B1, and this method is also applied to an $8^{th}$ information bit that corresponds to B7. First eight information bits of a second symbol of the first U-SIG field and first eight information bits of the second U-SIG field correspond to B0-B7 of a $2^{nd}$ symbol of the first U-SIG field and B0-B7 of a $2^{nd}$ symbol of the second U-SIG field, respectively.

The first 34 information bits of each of the first U-SIG field and the second U-SIG field include the following fields: a field indicating a version identifier, a DL/UL indication field, a BSS color indication field, a TXOP indication field, a bandwidth indication field, a PPDU format indication field, an STBC indication field, a spatial reuse indication field, a

TABLE 3

| First U-SIG field | | Second U-SIG field | |
|---|---|---|---|
| Information bit (Bit) | Field | Information bit (Bit) | Field |
| B0-B2 | Physical layer version (version identifier) | B0-B2 | Physical layer version (version identifier) |
| B3 | Uplink/downlink (UL/DL) | B3 | Uplink/downlink (UL/DL) |
| B4-B9 | Basic service set color (BSS color) | B4-9 | Basic service set color (BSS color) |
| B10-B16 | Transmission opportunity (TXOP) | B10-16 | Transmission opportunity (TXOP) |
| B17-B22 | Bandwidth | B17-22 | Bandwidth |
| B23-B24 | PPDU format | B23-24 | PPDU format |
| B25 | Space-time block coding (STBC) | B25 | Space-time block coding (STBC) |

GI and EHT-LTF size indication field, a field indicating an LDPC extra symbol segment, a PE disambiguity indication field, and a field indicating a pre-FEC padding factor.

The version identifier field has 3 information bits, the DL/UL indication field has 1 information bit, the BSS color indication field has 6 information bits, the TXOP indication field has 7 information bits, the bandwidth indication field has 6 information bits, the PPDU format indication field has 2 information bits, the STBC indication field has 1 information bit, the spatial reuse indication field has 2 information bits, the field indicating a GI and an EHT-LTF size has 2 information bits, the field indicating an LDPC extra symbol segment has 1 information bit, the PE disambiguity indication field has 1 information bit, and the field indicating a pre-FEC padding factor has 2 information bits.

Fields of the first 34 information bits of the first U-SIG field and the second U-SIG field may be arranged in an order in Table 1, or may be arranged in another order, provided that types of fields carried in corresponding information bits of the first U-SIG field and the second U-SIG field are correspondingly the same.

Further, a $35^{th}$ information bit (B8 in Table 4) to a $52^{nd}$ information bit (B25 in Table 4) of the $2^{nd}$ symbol of the first U-SIG field include a partial AID field, a cyclic redundancy code (CRC) indication field, and a tail bit (tail) indication field. The CRC indication field is used for information check. The tail indication field is specifically used to stop coding.

The partial AID field has 8 information bits, the CRC indication field has 4 information bits, and the tail indication field has 6 information bits. The partial AID field may be understood as the first indication subfield in the foregoing embodiment.

A $35^{th}$ information bit (B8 in Table 4) to a $52^{nd}$ information bit (B25 in Table 4) of the second U-SIG field include a field indicating a number of EHT-SIG field symbols or MU-MIMO users, an EHT-SIG MCS and DCM indication field, a CRC indication field, and a tail indication field. The field indicating a number of EHT-SIG field symbols or MU-MIMO users has 5 information bits, the EHT-SIG MCS and DCM indication field has 3 information bits, the CRC indication field has 4 information bits, and the tail indication field has 6 information bits.

For fields included in the first EHT-SIG field and fields included in the second EHT-SIG field, refer to Table 5 and Table 6.

Table 5 shows fields included in the first EHT-SIG field and a quantity of information bits of each field.

TABLE 5

| Information bit (Bit) | Field | Number (number of information bits) |
|---|---|---|
| B0-B2 | Partial AID | 3 |
| B3-B7 | Number of space-time streams and Doppler (NSTS and Doppler) | 5 |
| B8-B11 | Modulation and coding scheme (MCS) | 4 |
| B12 | Dual carrier modulation (DCM) | 1 |
| B13 | Beam change | 1 |
| B14 | Coding ( | 1 |
| B15 | Beamforming (beamformed) | 1 |
| B16-B19 | Cyclic redundancy code (CRC) | 4 |
| B20-B25 | Tail information bits (tail) | 6 |

As shown in Table 5, the first EHT-SIG field includes a partial AID field, a field indicating an NSTS and Doppler, an MCS indication field, a DCM indication field, a beam change indication field, a coding indication field, a beamformed indication field, a CRC indication field, and a tail indication field. The partial AID field has 3 information bits, the field indicating an NSTS and Doppler has 5 information bits, the MCS indication field has 4 information bits, the DCM indication field has 1 information bit, the beam change indication field has 1 information bit, the coding indication field has 1 information bit, the beamformed indication field has 1 information bit, the CRC indication field has 1 information bit, and the tail indication field has 6 information bits. The partial AID field in the first EHT-SIG field may be understood as the second indication subfield in the foregoing embodiment.

The partial AID field, the field indicating an NSTS and Doppler, the MCS indication field, the DCM indication field, the beam change indication field, the coding indication field, and the beamformed indication field in the first EHT-SIG field may be collectively referred to as a user field.

It can be learned that, in the SU transmission scenario, one part of an AID field is in the first U-SIG field, and the other part of the AID field is in the first EHT-SIG field. A sum of a quantity of information bits of the one part of the AID field and a quantity of information bits of the other part of the AID field is 11 information bits. The STA can receive the first U-SIG field to obtain the one part of the AID field and receive the first EHT-SIG field to obtain the other part of the AID, and obtain the AID with the 11 information bits based on the one part of the AID field and the other part of the AID, to determine a STA uniquely identified by the AID.

Table 6 shows fields included in the second EHT-SIG field and a quantity of information bits of each field.

TABLE 6

| Information bit (Bit) | Field | Number (number of information bits) |
|---|---|---|
| B0-B4 | Number of EHT-LTF symbols, a midamble periodicity, and Doppler (number of EHT-LTF symbols + midamble periodicity + Doppler) | 4 |
| B5-B15 | AID | 11 |
| ... | Number of space-time streams and Doppler (NSTS and Doppler) | 5 |
| | Modulation and coding scheme (MCS) | 4 |
| | Dual carrier modulation (DCM) | 1 |
| | Beam change | 1 |
| | Coding | 1 |
| | Beamforming (beamformed) | 1 |
| ... | AID | 11 |
| | Number of space-time streams and Doppler (NSTS and Doppler) | 5 |
| | Modulation and coding scheme (MCS) | 4 |
| | Dual carrier modulation (DCM) | 1 |
| | Beam change | 1 |
| | Coding | 1 |
| | Beamforming (beamformed) | 1 |
| ... | Cyclic redundancy code (CRC) | 4 |
| | Tail information bits (tail) | 6 |
| ... | ... | ... |

As shown in Table 6, the second EHT-SIG field includes a field indicating a number of EHT-LTF symbols, a midamble periodicity, and Doppler, a plurality of user fields, a CRC indication field, and a tail indication field. Each user field includes an AID, a field indicating an NSTS and Doppler, an MCS indication field, a DCM indication field, a beam change indication field, a coding indication field, a beamformed indication field, a CRC indication field, and a tail indication field. Every two user fields correspond to one CRC indication field and one tail indication field. The field indicating a number of EHT-LTF symbols, a midamble periodicity, and Doppler has 4 information bits, and the AID has 11 information bits. A quantity of information bits of each of the field indicating an NSTS and Doppler, the MCS indication field, the DCM indication field, the beam change indication field, the coding indication field, the beamformed indication field, the CRC indication field, and the tail indication field is correspondingly the same as a quantity of information bits of each field of the first EHT-SIG field. The AID of the second EHT-SIG field may be understood as the STA indication field in the foregoing embodiment.

It can be learned that, in the SU transmission scenario and the MU transmission scenario, a format of a U-SIG field is partially the same as that of an EHT-SIG field. This can help the STA receive the U-SIG field and the EHT-SIG field. In addition, some important fields are also included, for example, a spatial reuse field. In addition, a PPDU format indication field has 2 information bits, so that the field can carry more information. An AID field has 11 information bits. In this way, a STA in a BSS including the network device can be uniquely identified.

For example, in the SU transmission scenario, one part of an AID is in the first U-SIG field, and the other part of the AID field is in the first EHT-SIG field. A sum of a quantity of information bits of the one part of the AID field and a quantity of information bits of the one part of the AID field is 11 information bits. The STA can receive the first U-SIG field to obtain the one part of the AID field and receive the first EHT-SIG field to obtain the other part of the AID, and obtain the AID with the 11 information bits based on the one part of the AID field and the other part of the AID, to determine a STA uniquely identified by the AID.

In the MU transmission scenario, if the second EHT-SIG field includes an AID with 11 information bits, the STA may receive the second EHT-SIG field to obtain the AID, to determine a STA uniquely identified by the AID.

In an orthogonal frequency division multiplexing (OFDMA) transmission scenario, the second EHT-SIG field may include a resource unit allocation subfield (RU allocation subfield) indication field. In a non-OFDMA transmission scenario, the second EHT-SIG field may include a preamble puncturing indication field.

The resource unit allocation indication field includes one or more resource unit allocation indication subfields. Specifically, each STA corresponds to one resource unit allocation indication subfield, and each resource unit allocation indication subfield indicates resource unit allocation information of a corresponding STA. A quantity of information bits of the resource unit allocation indication field is related to a quantity n of STAs to which the network device sends the second PPDU. For example, if a quantity of information bits of each resource unit allocation indication subfield is m, a quantity of information bits of the resource unit allocation indication field is n*m. For example, m may be, but not limited to, 8.

In a scenario in which a bandwidth for transmitting a PPDU is greater than 20 MHz, the second EHT-SIG field may further include a center 26-tone RU indication field, where the field has 1-2 information bits.

The RU allocation subfield or the preamble puncturing indication field, and the center 26-tone RU indication field may be before the user field.

It should be noted that, in this application, fields that are before the identifier indication field and that are in the first U-SIG field include, but are not limited to, all fields of first eight information bits of a $1^{st}$ symbol of the first U-SIG field in Table 3 and all fields of first eight information bits of a $2^{nd}$ symbol in Table 4, or a part of fields may be omitted.

Similarly, the second U-SIG field includes, but is not limited to, all fields of first eight information bits of a $1^{st}$ symbol in the first U-SIG field in Table 3 and all fields of first eight information bits of the second symbol in Table 4. A quantity of information bits of each field is not limited to the quantities of information bits shown in Table 3 and Table 4.

An order of fields before the identifier indication field (first (N−1) fields) of the first U-SIG field and an order of first (N−1) fields of the second U-SIG field are not limited in this application, provided that a field type of the first (N−1) fields of the first U-SIG field is correspondingly to the same as a field type of the first (N−1) fields of the second U-SIG field.

In this application, fields of the first EHT-SIG field following the identifier indication field include, but are not limited to, all fields following the partial AID of the first EHT-SIG field in Table 4, or a part of fields may be omitted. Similarly, the second EHT-SIG field includes, but is not limited to, all user fields in Table 5, or a part of fields in each user field may be omitted.

An arrangement order of the user fields of the first EHT-SIG field and an arrangement order of the user fields of the second EHT-SIG field are also not limited in this application. The user field is not limited to being carried only in the first EHT-SIG field and the second EHT-SIG field, or a part of user fields may be carried in the first U-SIG field and the second U-SIG field.

In some embodiments, a part of fields may be removed from the first U-SIG field, the first EHT-SIG field, the second U-SIG field, and the second EHT-SIG field. For example, none of the first U-SIG field, the first EHT-SIG field, the second U-SIG field, and the second EHT-SIG field may include one or more of a beamforming indication field, a DCM indication field, or a coding indication field. Alternatively, a quantity of information bits of an AID indication field may be reduced. The information bits saved in this way are used to carry other information. For example, a quantity of information bits of the spatial reuse indication field may be increased, or a quantity of information bits of the preamble puncturing indication field may be increased.

In some other embodiments, a part of fields of the first EHT-SIG field is placed in the first U-SIG field, so that the first EHT-SIG field includes a complete identifier indication field, the quantity of information bits of the first U-SIG field is kept to be less than or equal to 52 information bits, and the quantity of information bits of the first EHT-SIG field is kept to be less than or equal to 26 information bits. In this case, the first EHT-SIG field includes the complete identifier indication field, so that the STA can better receive the identifier indication field.

In still another implementation, the first PPDU applicable to SU transmission in this embodiment of this application may alternatively be used only in SU transmission in a case of non-preamble puncturing. The second PPDU applicable to MU transmission in this embodiment of this application may be used in SU transmission in a preamble puncturing case.

Figure 5:
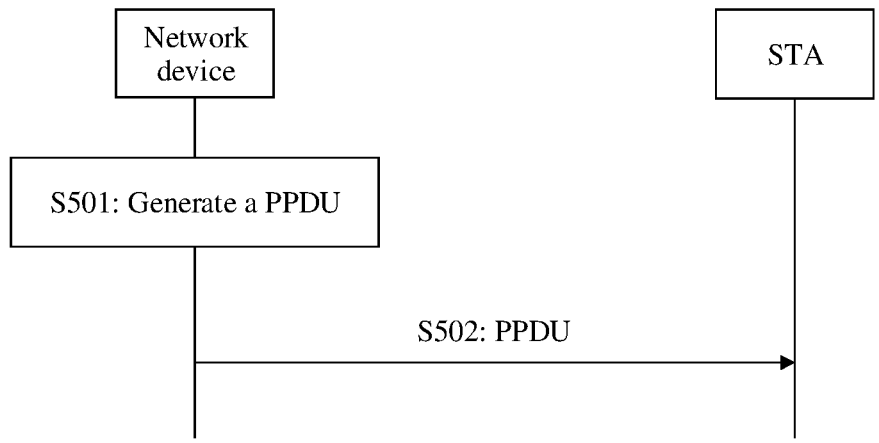
FIG. 5 is a schematic flowchart of a data transmission method according to another embodiment of this application.

Refer to FIG. 5. FIG. 5 is a schematic flowchart of a data transmission method according to an embodiment of this application. The data transmission method includes the following steps.

S501: A network device generates a PPDU.

The PPDU includes an EHT-SIG field, and the EHT-SIG field includes a field indicating a number of EHT-LTF symbols, a midamble periodicity, and Doppler.

Specifically, the field indicating a number of EHT-LTF symbols, a midamble periodicity, and Doppler has 4 information bits.

The field indicating a number of EHT-LTF symbols, a midamble periodicity, and Doppler may be any one of the following several cases:

the field indicating a number of EHT-LTF symbols, a midamble periodicity, and Doppler is a first string, where a first string group including the first string indicates that Doppler does not exist, the first string indicates the number of EHT-LTF symbols, each string in the first string group corresponds to one number of EHT-LTF symbols, and the first string may be any string in the first sub-string group;

the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, each string in the second string group corresponds to one number of EHT-LTF symbols, and the second string may be any string in the second sub-string group; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, each string in the third string group corresponds to one number of EHT-LTF symbols, and the third string may be any string in the third sub-string group.

S502: The network device sends the PPDU to a STA.

Correspondingly, the STA receives the PPDU sent by the network device.

As shown in Table 7, Table 7 provides a possible correspondence of a field indicating a number of EHT-LTF symbols, a midamble periodicity, and Doppler, and each of the following string groups: the first string group, the second string group, and the third string group.

TABLE 7

| Field A number of EHT-LTF symbols, a midamble periodicity, and Doppler | Meaning | | |
|---|---|---|---|
| (number of EHT-LTF symbols And midamble periodicity And Doppler) | Doppler | Number of EHT-LTF symbols | Midamble periodicity |
| 0000-1000 | 0 | 1/2/4/6/8/10/12/14/16 | N/A |
| 1001-1011 | 1 | 1/2/4 | 10 |
| 1100-1110 | 1 | 1/2/4 | 20 |
| 1111 | | Reserved | |

As shown in Table 6, the first string group may include binary values corresponding to 0 to 8, and each binary value correspondingly indicates one number of EHT-LTF symbols. Specifically, the nine binary values 0000, 0001, 0010, 0011, 0100, 0101, 0110, 0111, and 1000 sequentially indicate that the numbers of EHT-LTF symbols are 1, 2, 4, 6, 8, 10, 12, 14, or 16. The first string group indicates that Doppler does not exist. In this case, any string in the first string group can indicate, based on a first string group including the string, that Doppler does not exist. That is, each of the nine binary values 0000, 0001, 0010, 0011, 0100, 0101, 0110, 0111, and 1000 can indicate that Doppler does not exist.

The second string group may include binary values corresponding to 9 to 11, and each binary value corresponds to one number of EHT-LTF symbols. Specifically, the three binary values 1001, 1010, and 1011 respectively indicate that the numbers of EHT-LTF symbols are 1, 2, and 4. The second string group indicates that Doppler exists and that the midamble periodicity is a periodicity 1. In this case, each string in the second string group can indicate, based on a second string group including the string, that Doppler exists and that the midamble periodicity is the first periodicity. That is, each of the three binary values 1001, 1010, and 1011 can indicate that Doppler exists and that the midamble periodicity is the first periodicity.

The third string group may include binary values corresponding to 12 to 14, and each binary value corresponds to one number of EHT-LTF symbols. Specifically, the three binary values 1100, 1101, and 1110 respectively indicate that the numbers of EHT-LTF symbols are 1, 2, and 4. The third string group indicates that Doppler exists and that the midamble periodicity is a periodicity 2. In this case, each string in the third string group can indicate, based on a third string group including the string, that Doppler exists and that the midamble periodicity is the second periodicity. That is, each of the three binary values 1100, 1101, and 1110 can indicate that Doppler exists and that the midamble periodicity is the second periodicity.

The periodicity 1 and the periodicity 2 are different periodicities. In a possible embodiment, the periodicity 1 is 10, and the periodicity 2 is 20.

A binary value that can be carried by 4 information bits further include 1111. 1111 may be reserved to indicate other information. Such an indication manner not only can reduce a quantity of information bits, but also provide scalability to some extent.

In this case, a string group including a string indicates Doppler and a midamble periodicity, and a value of the string indicates a number of EHT-LTF symbols. Compared with a solution in which a field with 1 information bit indicates Doppler and a field with 4 information bits indicates a number of EHT-LTF symbols and a midamble periodicity, in this manner, a Doppler indication field may be omitted, to reduce a quantity of information bits of the field indicating a number of EHT-LTF symbols, a midamble periodicity, and Doppler.

It should be noted that the embodiment of the data transmission method corresponding to FIG. 5 can be combined with the embodiment of the data transmission method corresponding to FIG. 3.

Specifically, based on the embodiment of the data transmission method corresponding to FIG. 3, each of the fields indicating a number of EHT-LTF symbols, a midamble periodicity, and Doppler in the first EHT-SIG field and the second EHT-SIG field may use an indication manner of the field indicating a number of EHT-LTF symbol, a midamble periodicity, and Doppler in the embodiment of the data transmission method corresponding to FIG. 5.

Specifically, each of the fields indicating a number of EHT-LTF symbols, a midamble periodicity, and Doppler in the first EHT-SIG field and the second EHT-SIG field has 4 information bits. The field indicating a number of EHT-LTF symbols, a midamble periodicity, and Doppler may be any one of the following several cases:

the field indicating a number of EHT-LTF symbols, a midamble periodicity, and Doppler is a first string, where a first string group including the first string indicates that Doppler does not exist, the first string indicates the number of EHT-LTF symbols, each string in the first string group corresponds to one number of EHT-LTF symbols, and the first string may be any string in the first sub-string group;

the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, each string in the second string group corresponds to one number of EHT-LTF symbols, and the second string may be any string in the second sub-string group; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, each string in the third string group corresponds to one EHT-LT symbol quantity, and the third string may be any string in the third sub-string group.

In this way, information bits are saved in the foregoing manner, so that the first EHT-SIG field and the second EHT-SIG field can carry more information.

Figure 6:
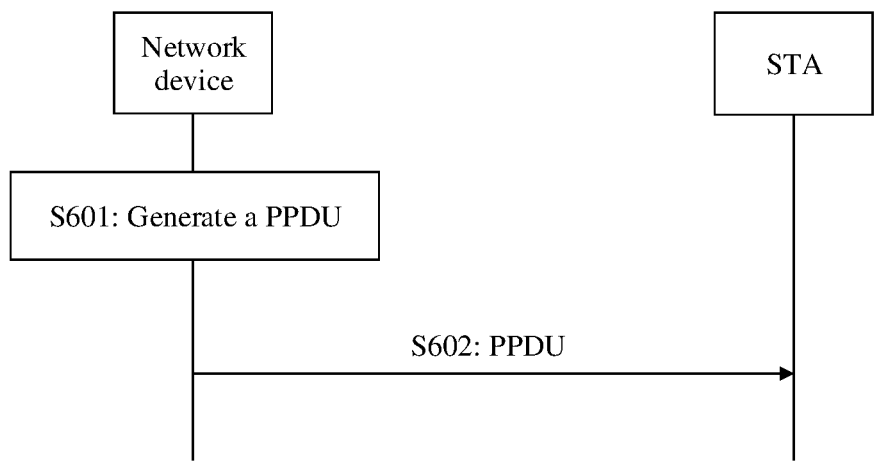
FIG. 6 is a schematic flowchart of a data transmission method according to still another embodiment of this application.

Refer to FIG. 6. FIG. 6 is a schematic flowchart of a data transmission method according to still another embodiment of this application. The data transmission method may include the following steps:

S601: A network device generates a PPDU.

S602: The network device sends the PPDU to a STA.

A bandwidth for sending the PPDU by the network device is greater than 20 MHz. The bandwidth includes a first sub-bandwidth and a second sub-bandwidth, where the first sub-bandwidth carries a first content channel CC 1 of an EHT-SIG field of the PPDU, and the second sub-bandwidth carries a second content channel CC 2 of the EHT-SIG field.

In some possible embodiments, an $i^{th}$ information bit to a $j^{th}$ information bit of the CC 1 carry a user field, and a field of first (i−1) information bits of the CC 1 is the same as a field of first (i−1) information bits of the CC 2, where both i and j are positive integers, and i<j; or an $i^{th}$ information bit to a $j^{th}$ information bit of the CC 1 carry a resource unit allocation indication field and a user field, and a field of first (i−1) information bits of the CC 1 is the same as a field of first (i−1) information bits of the CC 2, where both i and j are positive integers, and i<j. For example, in an OFDMA transmission scenario, the CC 1 includes a resource unit allocation indication field. The resource unit allocation indication field may be transmitted only on the CC 1, not on the CC 2. This can save a transmission resource.

Specifically, the user field may include, for example, a STA indication field, a field indicating an NSTS, a midamble periodicity, and Doppler, an MCS and DCM indication field, and a coding indication field.

Figure 7:
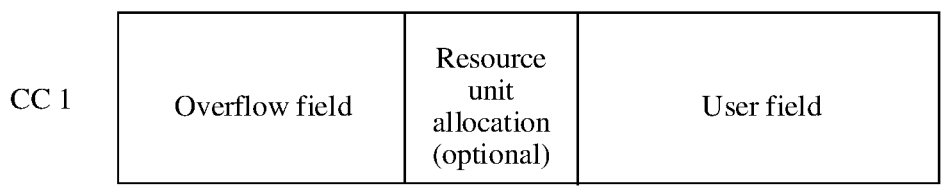
FIG. 7 is a schematic diagram of structures of a CC 1 and a CC 2 according to an embodiment of this application.
Figure 7:
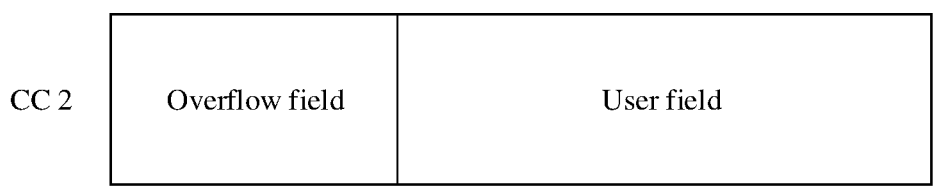

FIG. 7 is a schematic diagram of structures of the CC 1 and the CC 2 according to an embodiment of this application. As shown in FIG. 7, first (i−1) information bits of each of the CC 1 and the CC 2 carry a U-SIG overflow (U-SIG overflow) field. The U-SIG overflow field is duplicated and transmitted on each of the CC 1 and the CC 2. For example, the U-SIG overflow field may include, but is not limited to, one or more of the following fields: a field indicating a number of EHT-LTF symbols, a midamble periodicity, and Doppler, a DL/UL indication field, a bandwidth indication field, a PPDU format indication field, an STBC indication field, a spatial reuse indication field, a field indicating an LDPC extra symbol segment, and a PE disambiguity indication field, and a Pre-FEC padding factor.

In this way, the U-SIG overflow field is duplicated and transmitted on the CC 1 and the CC 2, so that a correct receiving probability of the STA can be increased.

A field of an $i^{th}$ information bit to a $j^{th}$ information bit of the CC 1 may be the same as or different from a field of an $i^{th}$ information bit to a $j^{th}$ information bit of the CC 2. The following describes possible cases of the fields of the $i^{th}$ information bit to the $j^{th}$ information bit of the CC 1 and the CC 2 when the $i^{th}$ information bit to the $j^{th}$ information bit of the CC 1 carry the user field and the field of the first (i−1) information bits of the CC 1 is the same as the field of the first (i−1) information bits of the CC 2.

In an embodiment, the field of the $i^{th}$ information bit to the $j^{th}$ information bit of the CC 2 is the same as the field of the $i^{th}$ information bit to the $j^{th}$ information bit of the CC 1. In other words, the $i^{th}$ information bit to the $j^{th}$ information bit of the CC 2 also carry a same user field. In this way, the user field is duplicated and transmitted on the CC 1 and the CC 2, so that a correct receiving probability of the STA can be increased, and reliability can be improved.

In another embodiment, the $i^{th}$ information bit to the $j^{th}$ information bit of the CC 1 carry a user field of the STA, and the $i^{th}$ information bit to the $j^{th}$ information bit of the CC 2 carry a padding field. In this way, lengths of the CC 2 and the CC 2 are the same. This helps the STA receive the CC 1 and the CC 2. In addition, the STA may not read this padding field, so that a reading process of the STA can be simplified.

In still another embodiment, the network device sends the PPDU to the STA in an SU scenario. The $i^{th}$ information bit to the $j^{th}$ information bit of the CC 1 carry a part of a user field of the STA, and information bits that follow the $i^{th}$ information bit and that are of the CC 2 carry the other part of the user field of the STA.

In yet another embodiment, the network device sends the PPDU to a plurality of STA in an MU scenario. The $i^{th}$ information bit to the $j^{th}$ information bit of the CC 1 carry a part of a user field of each of the plurality of STAs, and information bits that follow the $i^{th}$ information bit and that are of the CC 2 carry the other part of the user field of each of the plurality of STAs.

In still yet another embodiment, the network device sends the PPDU to a plurality of STA in an MU scenario. The $i^{th}$ information bit to the $j^{th}$ information bit of the CC 1 carry a user field of a part of the plurality of STAs, and the $i^{th}$ information bit to the $j^{th}$ information bit of the CC 2 carry a user field of the other part of the plurality of STAs.

Figure 8:
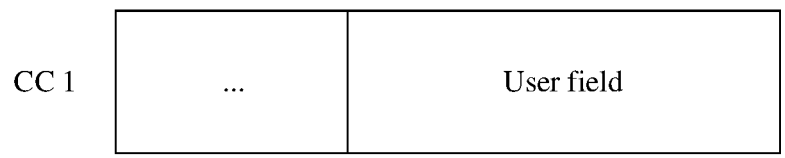
FIG. 8 is a schematic diagram of structures of a CC 1 and a CC 2 according to another embodiment of this application.
Figure 8:

FIG. 8 is a schematic diagram of structures of the CC 1 and the CC 2 according to another embodiment of this application. As shown in FIG. 8, in other possible embodiments, an $i^{th}$ information bit to a $j^{th}$ information bit of the CC 1 carry a user field, and an $i^{th}$ information bit to a $j^{th}$ information bit of the CC 2 carry a padding field, where both i and j are positive integers, and i<j. In other words, the user field is transmitted only on the CC 1, and the user field is not transmitted on the CC 2. In this way, the STA does not need to read this padding field, so that a reading process of the STA can be simplified.

When i>1, the manner in the foregoing embodiment may be used for fields of the first (i−1) information bits of the CC 1 and the CC 2, and the fields of the first (i−1) information bits of the CC 1 and the CC 2 are the same. A U-SIG overflow field is transmitted at the first (i−1) information bits of each of the CC 1 and the CC 2.

Alternatively, fields of the first (i−1) information bits of the CC 1 are different from fields of the first (i−1) information bits of the CC 2. For example, a U-SIG overflow field may be transmitted only on one of the CC 1 or the CC 2.

Optionally, the $i^{th}$ information bit to the $j^{th}$ information bit of the CC 1 or the $i^{th}$ information bit to the $j^{th}$ information bit of the CC 2 may further carry a resource unit allocation indication field. The resource unit allocation indication field may alternatively be transmitted only on one of the CC 1 or the CC 2.

When i=1, none of the CC 1 and the CC 2 includes a U-SIG overflow field.

Figure 9:
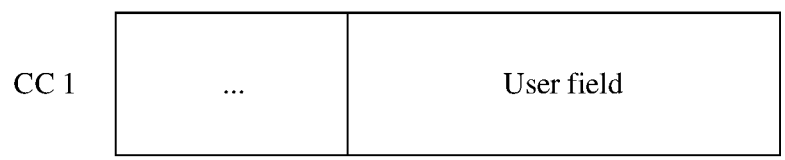
FIG. 9 is a schematic diagram of structures of a CC 1 and a CC 2 according to still another embodiment of this application.
Figure 9:
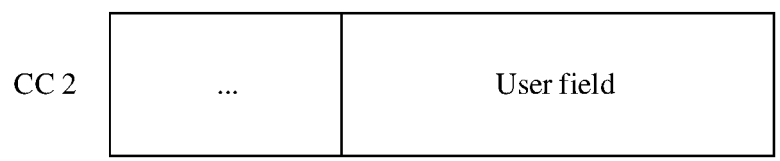

FIG. 9 is a schematic diagram of structures of the CC 1 and the CC 2 according to still another embodiment of this application. As shown in FIG. 9, in still other possible embodiments, a user field of the CC 1 is the same as a user field of the CC 2. In this way, the user field is duplicated and transmitted on the CC 1 and the CC 2, so that a correct receiving probability of the STA can be increased, and reliability can be improved.

Optionally, a format of the EHT-SIG field included in the PPDU in the foregoing several possible embodiments may be a format of the first EHT-SIG field or the second EHT-SIG field in the embodiment corresponding to FIG. 3.

Figure 10:
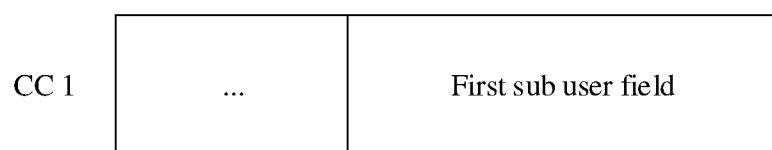
FIG. 10 is a schematic diagram of structures of a CC 1 and a CC 2 according to yet another embodiment of this application.
Figure 10:
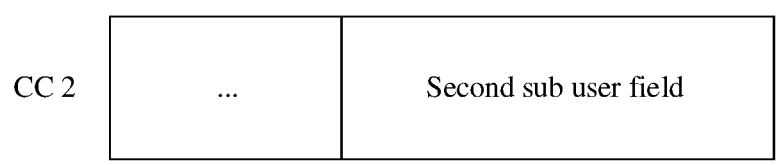

FIG. 10 is a schematic diagram of structures of the CC 1 and the CC 2 according to yet another embodiment of this application. As shown in FIG. 10, in yet other possible embodiments, the CC 1 includes a first sub user field, the CC 2 includes a second sub user field, and a user field of a first user includes the first sub user field and the second sub user field. That is, in this embodiment, a part of the user field of the same user is transmitted on the CC 1, and the other part is transmitted on the CC 2. In this way, a quantity of information bits for transmitting the user field can be increased, so that more information can be transmitted.

The field carried by the first (i−1) information bits of the CC 1 and the field carried by the first (i−1) information bits of the CC 2 in the foregoing embodiment may also be used in this embodiment. In this embodiment, a field that is before the first sub user field and that is of the CC 1 may be the field carried by the first (i−1) information bits of the CC 1 in the foregoing embodiment. In this embodiment, a field that is before the second sub user field and that is of the CC 2 may be the field carried by the first (i−1) information bits of the CC 2 in the foregoing embodiment.

It should be noted that the foregoing several possible embodiments may be combined within a proper range.

Figure 11:
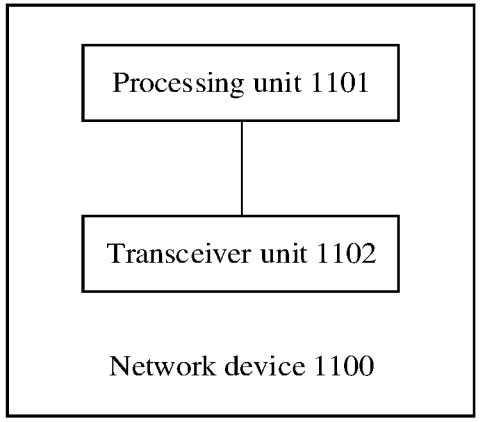
FIG. 11 is a schematic diagram of modules of a network device according to an embodiment of this application.

Refer to FIG. 11. FIG. 11 is a schematic diagram of modules of a network device according to an embodiment of this application. The network device 1100 includes: a processing unit 1101, configured to generate a first PPDU, where the first PPDU includes a first universal-Signaling field U-SIG field and a first extremely high throughput-Signaling field EHT-SIG field, and a sum of a quantity of information bits of the first U-SIG field and a quantity of information bits of the first EHT-SIG field is less than or equal to 78 information bits; and a transceiver unit 1102, configured to send an encoded first PPDU to a station.

The first U-SIG field and the first EHT-SIG field meet at least one of the following:

At least one of the first U-SIG field and the first EHT-SIG field includes an identifier indication field, where the identifier indication field is used to uniquely identify one station; the first U-SIG field or the first EHT-SIG field includes a PPDU format indication field, and the PPDU format indication field occupies more than 1 information bit; or the first demodulation indication field includes a spatial reuse indication field.

In this way, the technical solution of this embodiment of this application can ensure that the sum of the quantity of information bits of the first U-SIG field and the quantity of information bits of the first EHT-SIG field is less than or equal to 78 information bits. This reduces indication overheads. In addition, the first U-SIG field and the first EHT-SIG field can carry more information without increasing indication overheads.

In a possible implementation, at least one of the first U-SIG field and the first EHT-SIG field includes an identifier indication field. The identifier indication field is an association identifier (AID) for uniquely identifying one station. The station is a station in a basic service set (BSS) including the network device. In this way, an identifier indication field included in the encoded first PPDU can uniquely indicate one STA. The STA may learn, from the first U-SIG field and the first EHT-SIG field, whether the encoded first PPDU is sent to the STA, without continuing to receive a subsequent preamble data field. This reduces power consumption of the station. In addition, even if a data field following the first U-SIG field and a data field following the first EHT-SIG field are not correctly received, because the station can determine, based on the first U-SIG field and the first EHT-SIG field, that the first PPDU is sent to the station, the station may perform hybrid automatic repeat requests (HARQ) combined reception based on subsequent retransmission. Moreover, a third-party device can learn of a sender and a receiver of the first PPDU without causing interference to a device that is performing transmission. This helps the third-party device perform scheduling.

In another possible implementation, a field that indicates a PPDU format and that is included in the first U-SIG field or the first EHT-SIG field occupies more than 1 information bit. In this case, compared with a solution in which only one information bit is occupied for indicating the PPDU format, in this embodiment of this application, the PPDU format indication field occupies more than 1 information bit. In this way, the PPDU format indication field can carry more information, so that more functions can be supported.

The PPDU format indication field may indicate the PPDU format and indicate that a transmission mode is SU or MU transmission. In this way, when receiving a U-SIG field of first (N−1) information bits, the station can determine whether SU transmission or MU transmission is performed, and use a corresponding reception policy.

In still another possible implementation, the first U-SIG field or the first EHT-SIG field includes a spatial reuse indication field. This can support a spatial reuse function.

Optionally, a length of the spatial reuse indication field is 2 information bits. The spatial reuse indication field may indicate any one of the following four items: an item for prohibiting parameterized spatial reuse (Parameterized Spatial reuse DISALLOW, PSR_DISALLOW), an item for prohibiting spatial reuse transmission (SR_RESTRICTED), an item for delaying spatial reuse transmission (SR_DELAY), and an item for prohibiting both PSR based spatial reuse and non-SR group (Group) overlapping basic service set (OBSS)-packet detection based spatial reuse. The spatial reuse indication field is used by the station to implement a corresponding spatial reuse function.

For function implementation details and technical effects of the functional units of the network device 1100 provided in this embodiment, refer to descriptions about related details of the method provided in the foregoing method embodiments. Details are not described herein again.

Figure 12:
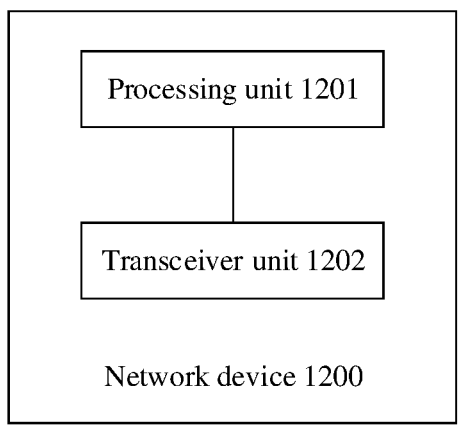
FIG. 12 is a schematic diagram of a structure of a network device according to another embodiment of this application.

Refer to FIG. 12. FIG. 12 is a schematic diagram of modules of a network device according to another embodiment of this application. An embodiment of this application further provides a network device 1200, including:

a processing unit 1201, configured to generate a PPDU; and a transceiver unit 1202, configured to send a PPDU to a station. The PPDU includes an EHT-SIG field, and the EHT-SIG field includes a field indicating a number of EHT-LTF symbols, a midamble periodicity, and Doppler. The field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this case, a string group including a string is used to indicate Doppler and a midamble periodicity, and a value of the string indicates a number of EHT-LTF symbols. This can save information bits for indicating Doppler and the midamble periodicity.

For function implementation details and technical effects of the functional units of the network device 1200 provided in this embodiment, refer to descriptions about related details of the method provided in the foregoing method embodiments. Details are not described herein again.

Figure 13:
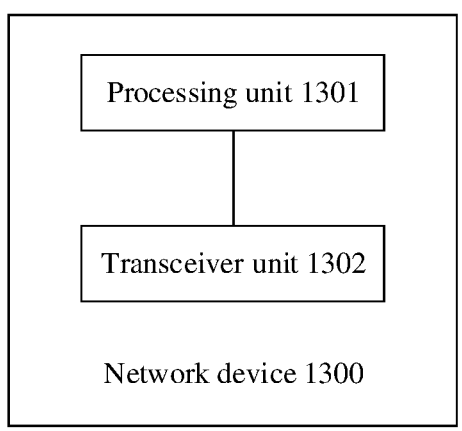
FIG. 13 is a schematic diagram of a structure of a network device according to another embodiment of this application.

Refer to FIG. 13. FIG. 13 is a schematic diagram of modules of a network device according to another embodiment of this application. An embodiment of this application further provides a network device 1300, including: a processing unit 1301, configured to generate a PPDU; and a transceiver unit 1302, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and a field of first (i−1) information bits of the first content channel is the same as a field of first (i−1) information bits of the second content channel, where both i and j are positive integers, and i<j; or an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel, where both i and j are positive integers, and i<j.

The field of the first (i−1) information bits of the first content channel and the field of the first (i−1) information bits of the second content channel may be understood as U-SIG overflow fields. In this case, the U-SIG overflow fields are duplicated and transmitted on the first content channel and the second content channel, so that a correct reception probability of the station can be increased.

For function implementation details and technical effects of the functional units of the network device 1300 provided in this embodiment, refer to descriptions about related details of the method provided in the foregoing method embodiments. Details are not described herein again.

Figure 14:
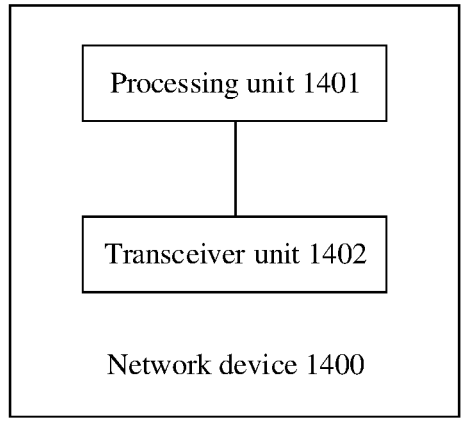
FIG. 14 is a schematic diagram of a structure of a network device according to another embodiment of this application.

Refer to FIG. 14. FIG. 14 is a schematic diagram of modules of a network device according to another embodiment of this application. An embodiment of this application further provides a network device 1400, including: a processing unit 1401, configured to generate a PPDU; and a transceiver unit 1402, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j.

In this way, a length of the first content channel is the same as a length of the second content channel. This helps the station receive the first content channel and the second content channel. In addition, the station may not read this padding field, so that a reading process of the station can be simplified.

For function implementation details and technical effects of the functional units of the network device 1400 provided in this embodiment, refer to descriptions about related details of the method provided in the foregoing method embodiments. Details are not described herein again.

Figure 15:
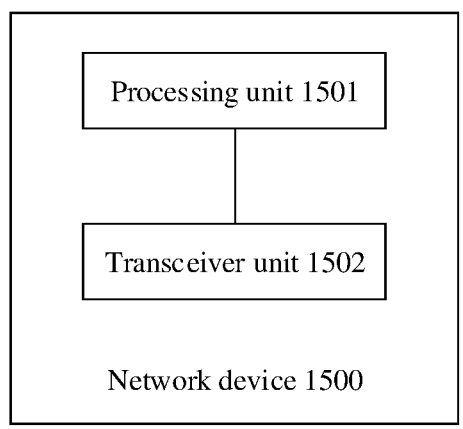
FIG. 15 is a schematic diagram of a structure of a network device according to another embodiment of this application.

Refer to FIG. 15. FIG. 15 is a schematic diagram of modules of a network device according to another embodiment of this application. An embodiment of this application further provides a network device 1500, including: a processing unit 1501, configured to generate a PPDU; and a transceiver unit 1502, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

The first content channel includes a first sub user field, the second content channel includes a second sub user field, and a user field of a first user includes the first sub user field and the second sub user field.

That is, in this embodiment, a part of the user field of the same user is transmitted on the first content channel, and the other part is transmitted on the second content channel. In this way, a quantity of information bits for transmitting the user field can be increased, so that more information can be transmitted.

For function implementation details and technical effects of the functional units of the network device 1500 provided in this embodiment, refer to descriptions about related details of the method provided in the foregoing method embodiments. Details are not described herein again.

Figure 16:
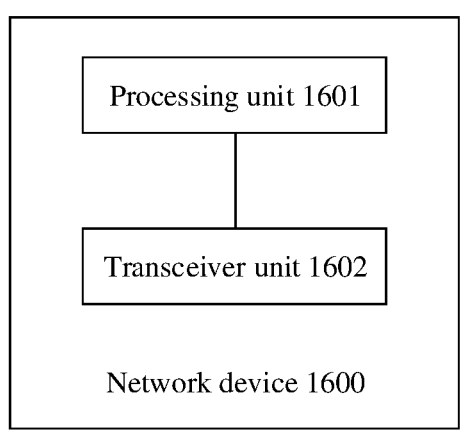
FIG. 16 is a schematic diagram of a structure of a network device according to another embodiment of this application.

Refer to FIG. 16. FIG. 16 is a schematic diagram of modules of a network device according to another embodiment of this application. An embodiment of this application further provides a network device 1600, including: a processing unit 1601, configured to generate a PPDU; and a transceiver unit 1602, configured to send the PPDU to a station. A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field. A user field of the first content channel is the same as a user field of the second content channel.

In this case, the user fields are duplicated and transmitted on the first content channel and the second content channel, so that a correct reception probability of the station can be increased, and reliability can be improved.

For function implementation details and technical effects of the functional units of the network device 1600 provided in this embodiment, refer to descriptions about related details of the method provided in the foregoing method embodiments. Details are not described herein again.

Figure 17:
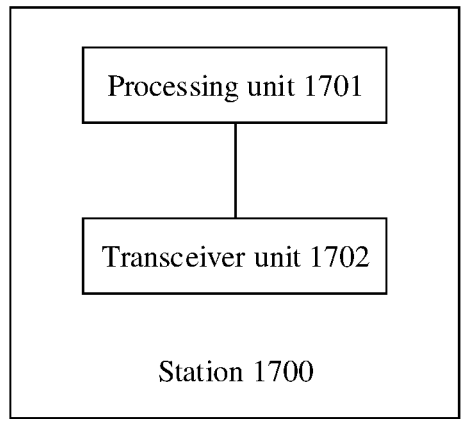
FIG. 17 is a schematic diagram of a structure of a station according to an embodiment of this application.

Refer to FIG. 17. FIG. 17 is a schematic diagram of modules of a station according to an embodiment of this application. An embodiment of this application further provides a station 1700, including: a transceiver unit 1702, configured to receive a first PPDU sent by a network device; and a processing unit 1701, configured to decode the first PPDU to obtain a decoded first PPDU. The decoded first PPDU includes a first U-SIG field and a first EHT-SIG field, and a sum of a quantity of information bits of the first U-SIG field and a quantity of information bits of the first EHT-SIG field is less than or equal to 78 information bits. The first U-SIG field and the first EHT-SIG field meet at least one of the following:

At least one of the first U-SIG field and the first EHT-SIG field includes an identifier indication field, where the identifier indication field is used to uniquely identify one station; the first U-SIG field or the first EHT-SIG field includes a PPDU format indication field, and the PPDU format indication field occupies more than 1 information bit; or the first demodulation indication field includes a spatial reuse indication field.

In this way, the technical solution of this embodiment of this application can ensure that the sum of the quantity of information bits of the first U-SIG field and the quantity of information bits of the first EHT-SIG field is less than or equal to 78 information bits. This reduces indication overheads. In addition, the first U-SIG field and the first EHT-SIG field can carry more information without increasing indication overheads, so that the station can obtain more information from the first U-SIG field and the first EHT-SIG field.

Specifically, in a possible implementation, at least one of the first U-SIG field and the first EHT-SIG field includes an identifier indication field. The identifier indication field is an association identifier (AID) for uniquely identifying one station. The station is a station in a basic service set (BSS) including the network device. In this way, an identifier indication field included in the encoded first PPDU can uniquely indicate one STA. The STA may learn, from the first U-SIG field and the first EHT-SIG field, whether the encoded first PPDU is sent to the STA, without continuing to receive a subsequent preamble data field. This reduces power consumption of the station. In addition, even if a data field following the first U-SIG field and a data field following the first EHT-SIG field are not correctly received, because the station can determine, based on the first U-SIG field and the first EHT-SIG field, that the first PPDU is sent to the station, the station may perform hybrid automatic repeat requests (HARQ) combined reception based on subsequent retransmission. Moreover, a third-party device can learn of a sender and a receiver of the first PPDU without causing interference to a device that is performing transmission. This helps the third-party device perform scheduling.

In another possible implementation, a field that indicates a PPDU format and that is included in the first U-SIG field or the first EHT-SIG field occupies more than 1 information bit. In this case, compared with a solution in which only one information bit is occupied for indicating the PPDU format, in this embodiment of this application, the PPDU format indication field occupies more than 1 information bit. In this way, the PPDU format indication field can carry more information, so that more functions can be supported.

The PPDU format indication field may indicate the PPDU format and indicate that a transmission mode is SU or MU transmission. In this way, when receiving a U-SIG field of first (N−1) information bits, the station can determine whether SU transmission or MU transmission is performed, and use a corresponding reception policy.

In still another possible implementation, the first U-SIG field or the first EHT-SIG field includes a spatial reuse indication field. This can support a spatial reuse function.

Optionally, a length of the spatial reuse indication field is 2 information bits. The spatial reuse indication field may indicate any one of the following four items: an item for prohibiting parameterized spatial reuse (Parameterized Spatial reuse DISALLOW, PSR_DISALLOW), an item for prohibiting spatial reuse transmission (SR_RESTRICTED), an item for delaying spatial reuse transmission (SR_DELAY), and an item for prohibiting both PSR based spatial reuse and non-SR group (Group) overlapping basic service set (OBSS)-packet detection based spatial reuse. The spatial reuse indication field is used by the station to implement a corresponding spatial reuse function.

For function implementation details and technical effects of the functional units of the station 1700 provided in this embodiment, refer to descriptions about related details of the method provided in the foregoing method embodiments. Details are not described herein again.

Figure 18:
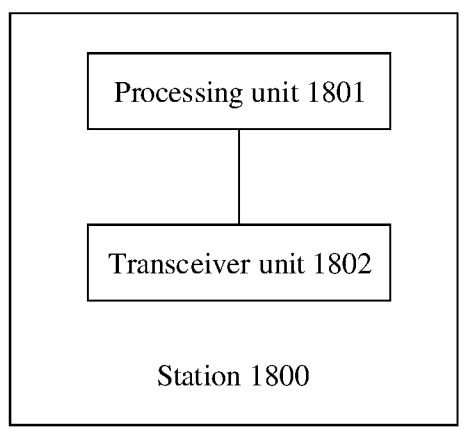
FIG. 18 is a schematic diagram of a structure of a station according to an embodiment of this application.

Refer to FIG. 18. FIG. 18 is a schematic diagram of modules of a station according to another embodiment of this application. An embodiment of this application further provides a station 1800, including a processing unit 1801 and a transceiver unit 1802.

The transceiver unit 1802 is configured to receive a PPDU sent by a network device.

The PPDU includes an EHT-SIG field, and the EHT-SIG field includes a field indicating a number of EHT-LTF symbols, a midamble periodicity, and Doppler. The field indicating a number of EHT-LTF symbols, a midamble periodicity, and Doppler is a first string, where a first string group including the first string indicates that Doppler does not exist, the first string indicates the number of EHT-LTF symbols, and each string in the first string group corresponds to one number of EHT-LTF symbols; the field indicating a number of EHT-LTF symbols, a midamble periodicity, and Doppler is a second string, where a second string group including the second string indicates that Doppler exists and that the midamble periodicity is a first periodicity, the second string indicates the number of EHT-LTF symbols, and each string in the second string group corresponds to one number of EHT-LTF symbols; or the field indicating a number of EHT-LTF symbols, a midamble periodicity, and Doppler is a third string, where a third string group including the third string indicates that Doppler exists and that the midamble periodicity is a second periodicity, the third string indicates the number of EHT-LTF symbols, and each string in the third string group corresponds to one number of EHT-LTF symbols.

In this way, the station determines Doppler and a midamble periodicity based on a string group including a string, and indicates a number of EHT-LTF symbols based on a value of the string. In this case, a quantity of information bits of a field indicating a number of EHT-LTF symbols, Doppler, and a midamble periodicity is reduced. In this way, the PPDU can carry more other information, so that the station can obtain more information from the PPDU.

For function implementation details and technical effects of the functional units of the station 1800 provided in this embodiment, refer to descriptions about related details of the method provided in the foregoing method embodiments. Details are not described herein again.

Figure 19:
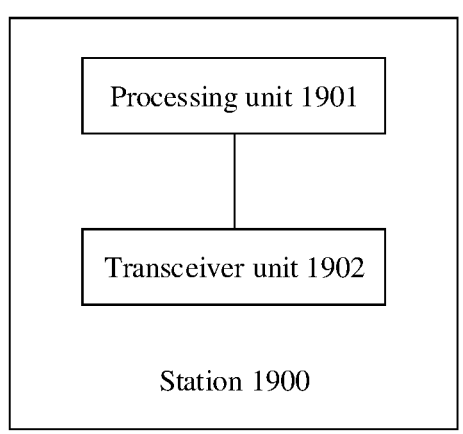
FIG. 19 is a schematic diagram of a structure of a station according to an embodiment of this application.

Refer to FIG. 19. FIG. 19 is a schematic diagram of modules of a station according to another embodiment of this application. An embodiment of this application further provides a station, including a processing unit 1901 and a transceiver unit 1902.

The transceiver unit 1902 is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and a field of first (i−1) information bits of the first content channel is the same as a field of first (i−1) information bits of the second content channel, where both i and j are positive integers, and i<j; or an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel, where both i and j are positive integers, and i<j.

For function implementation details and technical effects of the functional units of the station 1900 provided in this embodiment, refer to descriptions about related details of the method provided in the foregoing method embodiments. Details are not described herein again.

Figure 20:
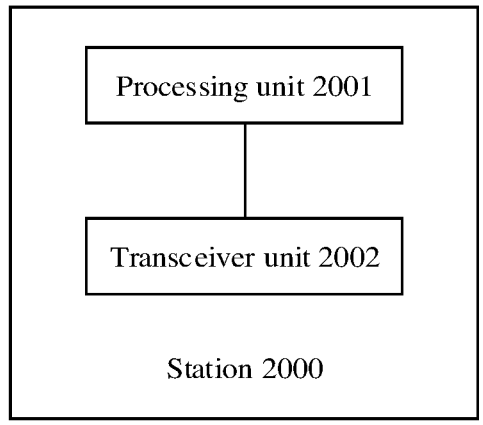
FIG. 20 is a schematic diagram of a structure of a station according to an embodiment of this application.

Refer to FIG. 20. FIG. 20 is a schematic diagram of modules of a station according to another embodiment of this application. An embodiment of this application further provides a station 2000, including a processing unit 2001 and a transceiver unit 2002.

The transceiver unit 2002 is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

An $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j.

For function implementation details and technical effects of the functional units of the station 2000 provided in this embodiment, refer to descriptions about related details of the method provided in the foregoing method embodiments. Details are not described herein again.

Figure 21:
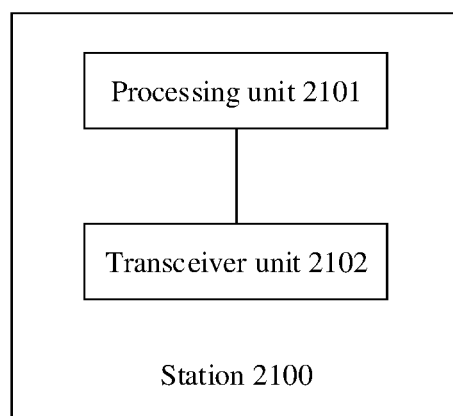
FIG. 21 is a schematic diagram of a structure of a station according to an embodiment of this application.

Refer to FIG. 21. FIG. 21 is a schematic diagram of modules of a station according to another embodiment of this application. An embodiment of this application further provides a station 2100, including a processing unit 2101 and a transceiver unit 2102.

The transceiver unit 2102 is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

The first content channel includes a first sub user field, the second content channel includes a second sub user field, and a user field of a first user includes the first sub user field and the second sub user field.

For function implementation details and technical effects of the functional units of the station 2100 provided in this embodiment, refer to descriptions about related details of the method provided in the foregoing method embodiments. Details are not described herein again.

Figure 22:
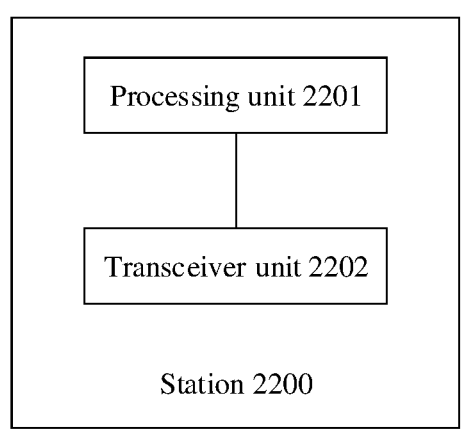
FIG. 22 is a schematic diagram of a structure of a station according to an embodiment of this application.

Refer to FIG. 22. FIG. 22 is a schematic diagram of modules of a station according to another embodiment of this application. An embodiment of this application further provides a station 2200, including a processing unit 2201 and a transceiver unit 2202.

The transceiver unit 2202 is configured to receive a PPDU sent by a network device. A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

A user field of the first content channel is the same as the user field of the second content channel.

For function implementation details and technical effects of the functional units of the station 2200 provided in this embodiment, refer to descriptions about related details of the method provided in the foregoing method embodiments. Details are not described herein again.

Figure 23:
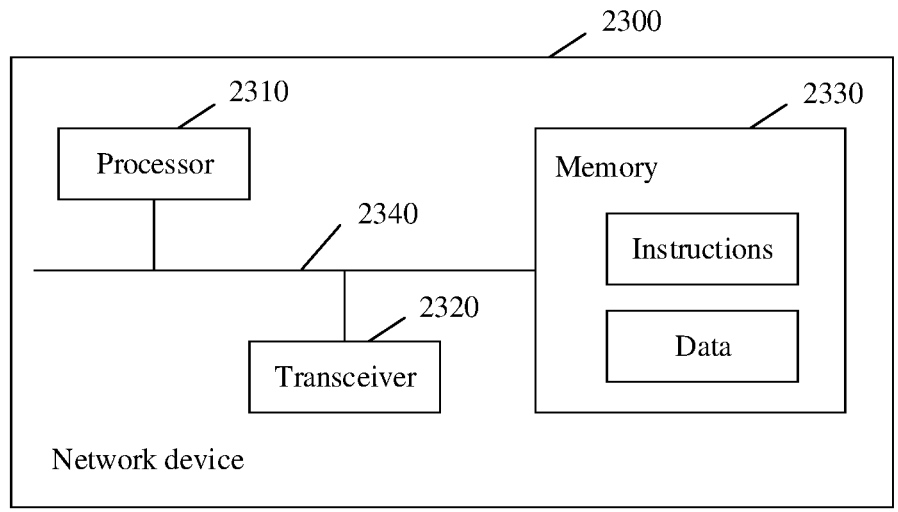
FIG. 23 is a schematic diagram of a structure of a network device according to an embodiment of this application.

FIG. 23 is a schematic diagram of a structure of a network device according to an embodiment of this application. Refer to FIG. 23. FIG. 23 schematically provides a possible basic hardware architecture of a network device according to this application.

A network device 2300 includes at least a processor 2310 and a transceiver 2320. The processor 2310 is coupled to the memory 2330. The processor 2310, the transceiver 2320, and the memory 2330 are connected to each other through a bus 2340.

The processor 2310 may be a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The transceiver 2320 may include a receiver and a transmitter, for example, a radio frequency module. That the processor 2310 receives or sends a message below may be specifically understood as that the processor 2310 receives or sends the message by using the transceiver. Optionally, the transceiver 2320 may be a transceiver circuit.

The memory 2330 may be a memory of the network device 2300, or may be an external memory connected to the processor 2310. The memory 2330 may be a physically independent unit, or may be integrated with the processor 2310. The memory 2330 includes but is not limited to a random access memory (RAM), a read-only memory (ROM), an erasable programmable read-only memory (EPROM, or flash memory), or a cache. The memory 2330 is configured to store related instructions and data, and may transmit the stored data to the processor 2310.

Specifically, the processor 2310 and the transceiver 2320 of the network device 2300 in this embodiment may be understood as the processing unit and the transceiver unit in the embodiment corresponding to any one of FIG. 11 to FIG. 16.

The processor 2310 of the network device 2300 is configured to read the related instructions in the memory 2330, to perform a part or all of the steps performed by the network device in any one of the foregoing method embodiments. For related descriptions and technical effects of the instructions executed by the processor of the network device 2300, refer to the foregoing method embodiments. Details are not described herein again.

For example, the processor 2310 of the network device 2300 is configured to read the related instructions in the memory 2330 to perform the following operations: generating a first PPDU, where the first PPDU includes a first universal-Signaling field U-SIG field and a first extremely high throughput-Signaling field EHT-SIG field, and a sum of a quantity of information bits of the first U-SIG field and a quantity of information bits of the first EHT-SIG field is less than or equal to 78 information bits; and sending the first PPDU to a STA by using the transceiver 2320.

The first U-SIG field and the first EHT-SIG field meet at least one of the following:

At least one of the first U-SIG field and the first EHT-SIG field includes an identifier indication field, where the identifier indication field is used to uniquely identify one station; the first U-SIG field or the first EHT-SIG field includes a PPDU format indication field, and the PPDU format indication field occupies more than 1 information bit; or the first demodulation indication field includes a spatial reuse indication field.

For another example, the processor 2310 of the network device 2300 is configured to read the related instructions in the memory 2330 to perform the following operations: generating a PPDU; and sending the PPDU to a STA by using the transceiver 2320.

A bandwidth for sending the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

The first content channel and the second content channel meet at least one of the following:

An $i^{th}$ information bit to a $j^{th}$ information bit of the first content channel carry a user field, and a field of first (i−1) information bits of the first content channel is the same as a field of first (i−1) information bits of the second content channel, where both i and j are positive integers, and i<j;

an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel, where both i and j are positive integers, and i<j;

an $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j;

the first content channel includes a first sub user field, the second content channel includes a second sub user field, and a user field of a first user includes the first sub user field and the second sub user field; or a user field of the first content channel is the same as the user field of the second content channel.

Figure 24:
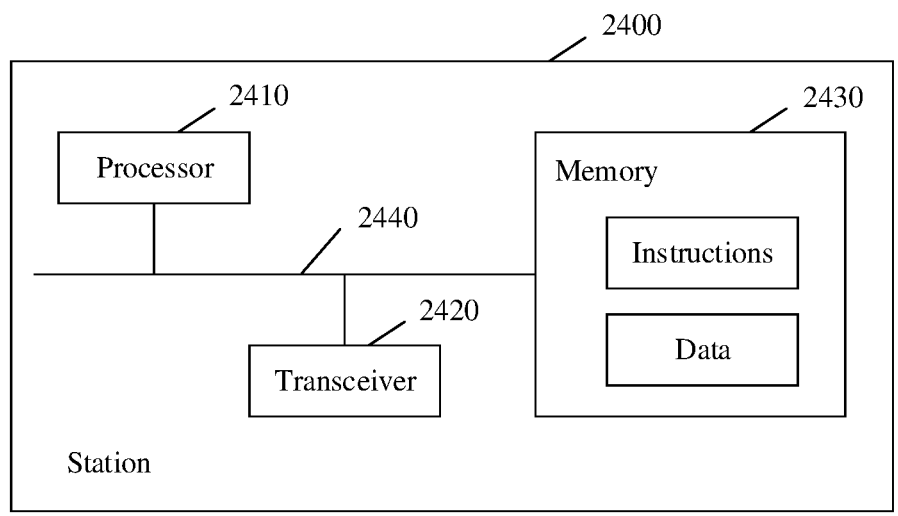
FIG. 24 is a schematic diagram of a structure of a station according to an embodiment of this application.

FIG. 24 is a schematic diagram of a structure of a station according to an embodiment of this application. Refer to FIG. 24. FIG. 24 schematically provides a possible basic hardware architecture of a station according to this application.

The station 2400 includes at least a processor 2410 and a transceiver 2420. The processor 2410 is coupled to the memory 2430. The processor 2410, the transceiver 2420, and the memory 2430 are connected to each other through a bus 2440.

The processor 2410 may be a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The transceiver 2420 may include a receiver and a transmitter, for example, a radio frequency module. That the processor 2410 receives or sends a message below may be specifically understood as that the processor 2410 receives or sends the message by using the transceiver.

The memory 2430 may be a memory of the station 2400, or may be an external memory connected to the processor 2410. The memory 2430 may be a physically independent unit, or may be integrated with the processor 2410. The memory 2430 includes but is not limited to a random access memory (RAM), a read-only memory (ROM), an erasable programmable read-only memory (EPROM, or flash memory), or a cache. The memory 2430 is configured to store related instructions and data, and may transmit the stored data to the processor 2410.

Specifically, the processor 2310 and the transceiver 2320 of the station 2400 in this embodiment may be understood as the processing unit and the transceiver unit in the embodiment corresponding to any one of FIG. 11 to FIG. 16.

The processor 2410 may read the related instructions in the memory 2430, to implement a part or all of the steps performed by the STA in any one of the methods provided in embodiments of this application. For related descriptions and technical effects of the instructions executed by the processor of the station 2400, refer to the foregoing method embodiments. Details are not described herein again.

For example, the processor 2410 of the STA 2400 is configured to read the related instructions in the memory 2430 to perform the following operations: receiving, by the transceiver 2320, a first PPDU sent by a network device; and decoding the first PPDU, where the decoded first PPDU includes a first U-SIG field and a first EHT-SIG field.

The first U-SIG field and the first EHT-SIG field meet at least one of the following:

at least one of the first U-SIG field and the first EHT-SIG field includes an identifier indication field, where the identifier indication field is used to uniquely identify one station;

the first U-SIG field or the first EHT-SIG field includes a PPDU format indication field, and the PPDU format indication field occupies more than 1 information bit; or the first demodulation indication field includes a spatial reuse indication field.

For another example, the processor 2410 of the STA 2400 is configured to read the related instructions in the memory 2430 to perform the following operations receiving, by the transceiver 1320, a PPDU sent by a network device.

A bandwidth for receiving the PPDU is greater than 20 MHz, and the bandwidth includes a first sub-bandwidth and a second sub-bandwidth. The first sub-bandwidth carries a first content channel of an EHT-SIG field of the PPDU, and the second sub-bandwidth carries a second content channel of the EHT-SIG field.

The first content channel and the second content channel meet at least one of the following:

an $i^{th}$ information bit to a $j^{th}$ information bit of the first content channel carry a user field, and a field of first (i−1) information bits of the first content channel is the same as a field of first (i−1) information bits of the second content channel, where both i and j are positive integers, and i<j;

an $i^{th}$ information bit to a $j^{th}$ information bit of the first content channel carry a resource unit allocation indication field and a user field, and a field of first (i−1) information bits of the first content channel is the same as a field of first (i−1) information bits of the second content channel, where both i and j are positive integers, and i<j;

an $i^{th}$ information bit to a $j^{th}$ information bit of the first content channel carry a user field, and an $i^{th}$ information bit to a $j^{th}$ information bit of the second content channel carry a padding field, where both i and j are positive integers, and i<j;

the first content channel includes a first sub user field, the second content channel includes the second sub user field, and a user field of a first user includes the first sub user field and the second sub user field; or a user field of the first content channel is the same as a user field of the second content channel.

Figure 25:
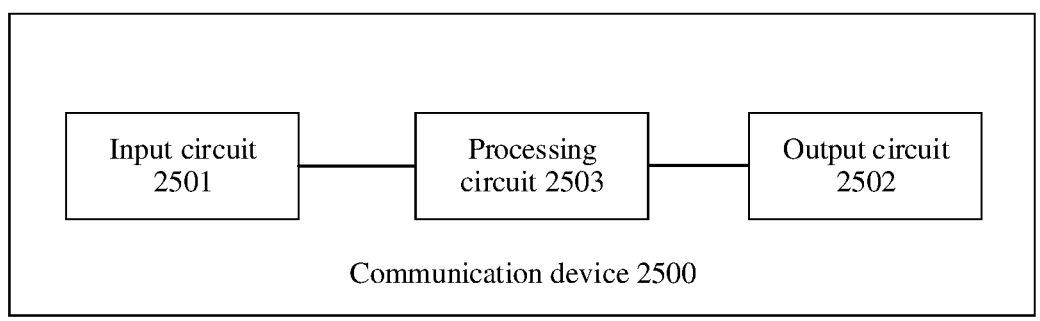
FIG. 25 is a schematic diagram of a structure of a communication device according to an embodiment of this application.

FIG. 25 is a schematic diagram of a structure of a communication device according to an embodiment of this application. An embodiment of this application further provides a communication device 2500, including an input circuit 2501, an output circuit 2502, and a processing circuit 2503. The processing circuit 2503 is configured to receive a signal through the input circuit 2501, and transmit a signal through the output circuit 2502, to implement a part or all of the steps in any one of the methods that may be performed by the network device or the STA in embodiments of this application.

In a specific implementation process, the communication device may be a chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. A specific implementation of the processor and various circuits is not limited in this application.

An embodiment of this application further provides a computer-readable storage medium. The computer-readable storage medium stores a computer program (which may also be referred to as code or instructions). When the computer program runs on a computer, the computer is enabled to perform a part or all of the steps in any one of the methods that may be performed by the network device or the STA in embodiments of this application.

An embodiment of this application further provides a computer program product including instructions. When the computer program product runs on a computer device, the computer device is enabled to perform a part or all of the steps in any one of the methods that may be performed by the network device or the STA.

In an embodiment, the network device in FIG. 1 or FIG. 2 is an access point (AP). The access point may be an access point for a terminal device (for example, a mobile phone) to enter a wired (or wireless) network, and is mainly deployed at home, inside a building, or inside a campus. A typical coverage radius is tens of meters to hundreds of meters. Certainly, the access point may also be deployed outdoors. The access point is equivalent to a bridge that connects the wired network and the wireless network. A main function of the access point is to connect various wireless network clients together and then connect the wireless network to the Ethernet. Specifically, the access point may be a terminal device (such as a mobile phone) or a network device (such as a router) with a wireless fidelity (wireless-fidelity, Wi-Fi) chip. The access point may be a device supporting the 802.11be standard. Alternatively, the access point may be a device supporting a plurality of wireless local area network (WLAN) standards of the 802.11 family such as the 802.11be standard, the 802.11ax standard, the 802.11ac standard, the 802.11n standard, the 802.11g standard, the 802.11b standard, and the 802.11a standard. The access point in this application may be a high efficient (HE) AP or an extremely high throughput (EHT) AP, or may be an access point applicable to a future Wi-Fi standard.

In still another embodiment, the network device in FIG. 1 or FIG. 2 is a non-access point station (non-AP STA). The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. Optionally, the station may support the 802.11be standard. The station may also support a plurality of wireless local area network (WLAN) standards of the 802.11 family such as the 802.11be standard, the 802.11ax standard, the 802.11ac standard, the 802.11n standard, the 802.11g standard, the 802.11b standard, and the 802.11a standard. The station in this application may be a high efficient (HE) STA or an extremely high throughput (EHT) STA, or may be a STA applicable to a future Wi-Fi standard.

For example, the access point and the station may alternatively be devices applied to the Internet of vehicles, Internet of things nodes or sensors in the Internet of things (IoT), sensors in smart city, or smart cameras, smart remote controls, or smart water meters in smart home.

The access point and the station may alternatively be communication servers, switches, bridges, or computers.

The technical solutions provided in this application are applicable to data communication between an AP and one or more STAs, and are also applicable to communication between APs and communication between STAs.

Although embodiments of this application are mainly described by using a network deployed based on IEEE 802.11 as an example, a person skilled in the art easily understands that various aspects of this application may be extended to other networks using various standards or protocols such as BLUETOOTH, a high performance radio LAN (HIPERLAN) (a wireless standard similar to the IEEE 802.11 standard and mainly used in Europe), a wide area network (WAN), a wireless local area network (WLAN), a personal area network (PAN), or other networks currently known or later developed. Therefore, the various aspects provided in this application are applicable to any suitable wireless network regardless of coverage and a wireless access protocol.

It should be further understood that "first", "second", "third", "fourth", and various numbers in this specification are merely used for differentiation for ease of description, and are not construed as a limitation to the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The software product is stored in a storage medium, and includes several instructions for instructing a computer device (which may be a personal computer, a server, a network device, or the like) to perform all or a part of the steps in the methods described in embodiments of this application. The foregoing storage medium includes any medium that can store program code, such as a USB flash drive, a removable hard disk, a read-only memory (ROM), a random access memory (RAM), a magnetic disk, or an optical disc.

An order of the steps in the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to a part of technical features thereof, without departing from the scope of the technical solutions of embodiments of this application.

What is claimed is:

1. A method comprising:
generating, by a network device, a single user physical layer protocol data unit (SU PPDU); and
sending, by the network device, the SU PPDU to a station over a bandwidth greater than 20 MHz, the bandwidth comprising a first sub-bandwidth and a second sub-bandwidth, wherein the first sub-bandwidth carries a first content channel of an extremely high throughput-signaling (EHT-SIG) field of the SU PPDU, and the second sub-bandwidth carries a second content channel of the EHT-SIG field; and
wherein an universal signal (U-SIG) overflow field of the first content channel is the same as an U-SIG overflow field of the second content channel, and an $i^{th}$ information bit to a $j^{th}$ information bit of the first content channel carry a user field, wherein both i and j are positive integers, and $i<j$; and wherein an $i^{th}$ information bit to a $j^{th}$ information bit of the second content channel carry a user field and a padding field, and the user field of the first content channel is the same as the user field of the second content channel.

2. A method comprising:
receiving, by a station, a single user physical layer protocol data unit (SU PPDU) over a bandwidth greater than 20 MHz, the bandwidth comprising a first sub-bandwidth and a second sub-bandwidth, wherein the first sub-bandwidth carries a first content channel of an extremely high throughput-signaling (EHT-SIG) field of the SU PPDU, and the second sub-bandwidth carries a second content channel of the EHT-SIG field; and wherein an universal signal (U-SIG) overflow field of the first content channel is the same as an U-SIG overflow field of the second content channel, and an $i^{th}$ information bit to a $j^{th}$ information bit of the first content channel carry a user field, wherein both i and j are positive integers, and i<j; and wherein an $i^{th}$ information bit to a $j^{th}$ information bit of the second content channel carry a user field and a padding field, and the user field of the first content channel is the same as the user field of the second content channel.

3. The method according to claim 2, wherein the user field comprises an association identifier (AID) field, which uniquely identifies the station.

4. The method according to claim 2, wherein the SU PPDU comprises an universal signal (U-SIG) field, the U-SIG field comprises a PPDU format indication field, and the PPDU format indication field occupies more than 1 information bit.

5. The method according to claim 4, wherein the PPDU format indication field comprises:
information indicating that a transmission scenario is SU, multi-user (MU) non-orthogonal frequency division multiple access (MU non-OFDMA), or MU orthogonal frequency division multiple access (MU OFDMA); or
information indicating a trigger based (TB) frame.

6. The method according to claim 4, wherein the U-SIG field comprises one or more of following:
a physical layer version identifier field, an uplink/downlink (UL/DL) indication field, a basic service set (BSS) color indication field, a transmission opportunity (TXOP) indication field, a bandwidth indication field, or the PPDU format indication field.

7. The method according to claim 2, wherein the EHT-SIG field comprises a spatial reuse indication field.

8. An apparatus comprising:
a processor, configured to generate a single user physical layer protocol data unit (SU PPDU); and
a transceiver, configured to send the SU PPDU to a station over a bandwidth greater than 20 MHz, the bandwidth comprising a first sub-bandwidth and a second sub-bandwidth, wherein the first sub-bandwidth carries a first content channel of an extremely high throughput-signaling (EHT-SIG) field of the SU PPDU, and the second sub-bandwidth carries a second content channel of the EHT-SIG field; and wherein an universal signal (U-SIG) overflow field of the first content channel is the same as an U-SIG overflow field of the second content channel, and an $i^{th}$ information bit to a $j^{th}$ information bit of the first content channel carry a user field, wherein both i and j are positive integers, and i<j; and wherein an $i^{th}$ information bit to a $j^{th}$ information bit of the second content channel carry a user field and a padding field, and the user field of the first content channel is the same as the user field of the second content channel.

9. An apparatus comprising:
a transceiver, configured to receive a single user physical layer protocol data unit (SU PPDU) over a bandwidth greater than 20 MHz, the bandwidth comprising a first sub-bandwidth and a second sub-bandwidth, wherein the first sub-bandwidth carries a first content channel of an extremely high throughput-signaling (EHT-SIG) field of the SU PPDU, and the second sub-bandwidth carries a second content channel of the EHT-SIG field; and wherein an universal signal (U-SIG) overflow field of the first content channel is the same as an U-SIG overflow field of the second content channel, and an $i^{th}$ information bit to a $j^{th}$ information bit of the first content channel carry a user field, wherein both i and j are positive integers, and i<j; and wherein an $i^{th}$ information bit to a $j^{th}$ information bit of the second content channel carry a user field and a padding field, and the user field of the first content channel is the same as the user field of the second content channel.

10. The apparatus according to claim 9, wherein the user field comprises an association identifier (AID) field, which uniquely identifies the apparatus.

11. The apparatus according to claim 9, wherein the SU PPDU comprises an universal signal (U-SIG) field, the U-SIG field comprises a PPDU format indication field, and the PPDU format indication field occupies more than 1 information bit.

12. The apparatus according to claim 11, wherein the PPDU format indication field comprises:
information indicating that a transmission scenario is SU, multi-user (MU) non-orthogonal frequency division multiple access (MU non-OFDMA), or MU orthogonal frequency division multiple access (MU OFDMA); or
information indicating a trigger based (TB) frame.

13. The apparatus according to claim 11, wherein the U-SIG field comprises one or more of following:
a physical layer version identifier field, an uplink/downlink (UL/DL) indication field, a basic service set (BSS) color indication field, a transmission opportunity (TXOP) indication field, a bandwidth indication field, or the PPDU format indication field.

14. The apparatus according to claim 9, wherein the EHT-SIG field comprises a spatial reuse indication field.

* * * * *

UNITED STATES PATENT AND TRADEMARK OFFICE
CERTIFICATE OF CORRECTION

PATENT NO. : 11,757,585 B2
APPLICATION NO. : 17/941778
DATED : September 12, 2023
INVENTOR(S) : Yu et al.

It is certified that error appears in the above-identified patent and that said Letters Patent is hereby corrected as shown below:

In the Specification

In Column 23, Line 53, delete "no" and insert -- 110 --.

In Column 23, Line 54, delete "no" and insert -- 110 --.

In Column 40, Line 25, after "CC" delete "2" and insert -- 1 --.

Signed and Sealed this
Fifth Day of December, 2023

Katherine Kelly Vidal
*Director of the United States Patent and Trademark Office*